US011175409B2

(12) United States Patent
Diggelen et al.

(10) Patent No.: US 11,175,409 B2
(45) Date of Patent: *Nov. 16, 2021

(54) REAL-TIME ESTIMATION OF SPEED AND GAIT CHARACTERISTICS USING A CUSTOM ESTIMATOR

(71) Applicant: GOOGLE LLC, Mountain View, CA (US)

(72) Inventors: Frank Van Diggelen, San Jose, CA (US); Ke Xiao, Mountain View, CA (US); Gustavo Moura, Mountain View, CA (US); Wyatt Riley, Chesterbrook, PA (US)

(73) Assignee: GOOGLE LLC, Mountain View, CA (US)

(*) Notice: Subject to any disclaimer, the term of this patent is extended or adjusted under 35 U.S.C. 154(b) by 11 days.

This patent is subject to a terminal disclaimer.

(21) Appl. No.: 16/729,933

(22) Filed: Dec. 30, 2019

(65) Prior Publication Data
US 2020/0132853 A1 Apr. 30, 2020

Related U.S. Application Data

(63) Continuation of application No. 15/370,240, filed on Dec. 6, 2016, now Pat. No. 10,564,288.

(51) Int. Cl.
G01S 19/19 (2010.01)
H04L 25/03 (2006.01)
(Continued)

(52) U.S. Cl.
CPC .............. *G01S 19/19* (2013.01); *G01C 21/16* (2013.01); *G01S 19/52* (2013.01);
(Continued)

(58) Field of Classification Search
CPC ......... G01S 19/19; G01S 19/52; G01C 21/16; H04L 25/03101; H04L 41/22
See application file for complete search history.

(56) References Cited

U.S. PATENT DOCUMENTS 10,564,288 B2 *  2/2020  Diggelen ............... G01S 19/19
2002/0111717 A1  8/2002  Scherzinger et al.
(Continued)

FOREIGN PATENT DOCUMENTS

EP    1 253 404 A2    10/2002

OTHER PUBLICATIONS

Calibrating Your Apple Watch for Improved Workout and Activity Accuracy, https://support.apple.com/en-US/HT204516, retrieved from the internet on Dec. 6, 2016, 2 pages.
(Continued)

*Primary Examiner* — Bryan Bui
(74) *Attorney, Agent, or Firm* — Marshall, Gerstein & Borun LLP

(57) ABSTRACT

In a method for accurately estimating gait characteristics of a user, first parameters indicative of user movement, including a GNSS-derived speed and step count, are monitored. Values of the first parameters are processed to determine values of second parameters indicative of movement of the user. The processing includes using values of at least one monitored parameter to generate one or more inputs to an estimator (e.g., Kalman filter) having the second parameters as estimator states. At least two of the second parameters are collectively indicative of a mapping between step frequency and step length of the user. A graphical user interface may display values of at least one of the second parameters, and/or at least one parameter derived from one or more of the second parameters.

21 Claims, 7 Drawing Sheets

(51) Int. Cl.
  *H04L 12/24* (2006.01)
  *G01S 19/52* (2010.01)
  *G01C 21/16* (2006.01)
  *H04W 88/02* (2009.01)
  *G01S 19/49* (2010.01)
  *G01S 19/47* (2010.01)

(52) U.S. Cl.
  CPC ........ *H04L 25/03101* (2013.01); *H04L 41/22* (2013.01); *G01S 19/47* (2013.01); *G01S 19/49* (2013.01); *H04W 88/02* (2013.01)

(56) References Cited

U.S. PATENT DOCUMENTS

| | | | |
|---|---|---|---|
| 2010/0250179 A1 | 9/2010 | Mariano et al. | |
| 2016/0188373 A1* | 6/2016 | Ige | G06F 9/5038 718/103 |
| 2016/0334433 A1 | 11/2016 | Kazemi | |
| 2018/0156920 A1* | 6/2018 | Diggelen | G01S 19/19 |

OTHER PUBLICATIONS

How do I Measure and Adjust my Stride Length?, https://help.fitbit.eom/articles/en_US/Help_article/1135, retrieved from the internet on Dec. 6, 2016, 3 pages.

Bennett et al., "An Extended Kalman Filter to Estimate Human Gait Parameters and Walking Distance", American Control Conference (ACC), Washington, DC, Jun. 17-19, 2013, 6 pages.

New Feature Suggestion Monitoring Cadence/Stride Rate When Running, <https://en.discussions.tomtom.com/runner-multi-sport-184/new-feature-suggestion-monitoring-cadencestride-rate-when-running-974885>, 4 pages.

International Search Report and Written Opinion for Application No. PCT/US2017/053911, dated Dec. 15, 2017.

Office Action for European Application No. 17787068.0, dated Sep. 10, 2020.

First Examination Report for India Application No. 201947007814, dated Feb. 22, 2021.

* cited by examiner

REAL-TIME ESTIMATION OF SPEED AND GAIT CHARACTERISTICS USING A CUSTOM ESTIMATOR

CROSS-REFERENCE TO RELATED APPLICATIONS

This is a continuation of U.S. patent application Ser. No. 15/370,240, filed Dec. 6, 2016 and entitled "Real-Time Estimation of Speed and Gait Characteristics Using a Custom Estimator," the entire disclosure of which is hereby incorporated by reference herein.

FIELD OF TECHNOLOGY

The present disclosure relates to the estimation of parameters describing movement of a user and, more particularly, to systems and methods for providing accurate, real-time estimation of speed and gait characteristics of the user.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Many runners desire to monitor speed or pace in order to assess performance, determine whether personal goals are being met and, ultimately, improve running performance. To this end, many runners carry smartphones and/or smart watches that include Global Navigation Satellite System (GNSS) receivers. GNSS may include one or more of the Global Positioning System (GPS) of the United States of America, GLONASS of Russia, BeiDou of China, Galileo of Europe, QZSS of Japan, and/or IRNSS of India. Speed estimates are derived from GNSS locations, or from the Doppler shifts of GNSS signals. Unfortunately, GNSS-based speed measurements tend to be noisy and therefore inaccurate. Noise/inaccuracy is caused by factors such as blockage of GNSS signals (e.g., when running inside a building or under a bridge), multipath reflection of GNSS signals (e.g., when running in a downtown area of a city), and arm swing (e.g., if the device is handheld or worn on the wrist or upper arm). These factors can easily cause an instantaneous, GNSS-based speed measurement to be up to 50% lower than, or 100% higher than, the user's true speed at any given moment. To reduce the level of noise, some devices apply heavy smoothing/averaging to the GNSS speed measurements. While this may reduce the magnitude of speed measurement errors when the user's pace is fairly constant, the technique is insufficiently responsive to large and sudden changes in speed, such as when a user runs intervals, or briefly stops at a crosswalk, etc.

SUMMARY

In one example embodiment, a method for accurately estimating gait characteristics of a user is implemented in a computing device. The method includes monitoring a first plurality of parameters indicative of movement of the user. Monitoring the first plurality of parameters includes monitoring (i) a first GNSS-derived speed of the user and (ii) a step count of the user. The method also includes processing values of the monitored first plurality of parameters to determine values of a second plurality of parameters indicative of movement of the user. Processing values of the monitored first plurality of parameters includes using values of at least one of the monitored first plurality of parameters to generate one or more inputs to an estimator (e.g., a Kalman filter) having the second plurality of parameters as estimator states. At least two parameters of the second plurality of parameters are collectively indicative of a mapping between step frequency of the user and step length of the user. The method also includes causing a graphical user interface of the computing device or another computing device to display values of one or both of (i) at least one of the second plurality of parameters, and (ii) at least one parameter derived from one or more of the second plurality of parameters.

In another example embodiment, a non-transitory, computer-readable medium stores instructions that, when executed by one or more processors of a computing device, cause the computing device to monitor a first plurality of parameters indicative of movement of a user. The first plurality of parameters includes (i) a first GNSS-derived speed of the user and (ii) a step count of the user. The instructions also cause the computing device to process values of the monitored first plurality of parameters to determine values of a second plurality of parameters indicative of movement of the user. Processing values of the monitored first plurality of parameters includes using values of at least one of the first plurality of parameters to generate one or more inputs to an estimator (e.g., a Kalman filter) having the second plurality of parameters as estimator states. At least two parameters of the second plurality of parameters are collectively indicative of a mapping between step frequency of the user and step length of the user. The instructions also cause the computing device to display on a graphical user interface of the computing device, or cause a graphical user interface of another computing device to display, values of one or both of (i) at least one of the second plurality of parameters, and (ii) at least one parameter derived from one or more of the second plurality of parameters In another example embodiment, a mobile computing device includes a display screen, one or more processors, and a memory. The memory stores instructions that, when executed by the one or more processors, cause the mobile computing device to monitor a first plurality of parameters indicative of movement of a user of the mobile computing device. The first plurality of parameters includes (i) a first GNSS-derived speed of the user and (ii) a step count of the user. The instructions also cause the mobile computing device to process values of the monitored first plurality of parameters to determine values of a second plurality of parameters indicative of movement of the user. Processing values of the monitored first plurality of parameters includes using values of at least one of the monitored first plurality of parameters as inputs to an estimator (e.g., a Kalman filter) having the second plurality of parameters as estimator states. At least two parameters of the second plurality of parameters are collectively indicative of a mapping between step frequency of the user and step length of the user. The instructions also cause the mobile computing device to display, on a graphical user interface presented on the display screen, values of one or both of (i) at least one of the second plurality of parameters, and (ii) at least one parameter derived from one or more of the second plurality of parameters.

DETAILED DESCRIPTION OF THE DRAWINGS

Overview

Figure 1:
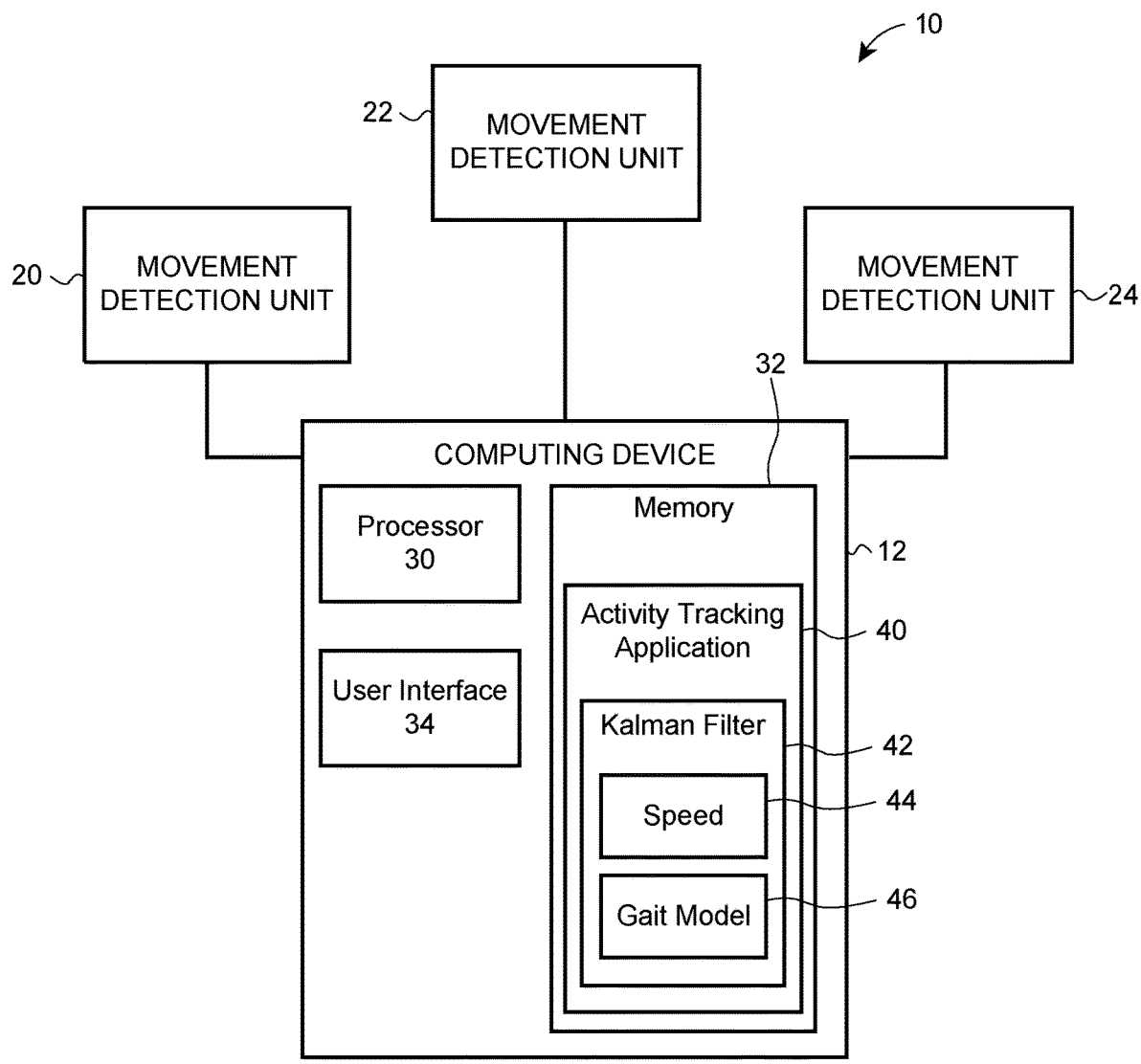
FIG. 1 is a block diagram of an example system in which techniques for real-time estimation of a user's speed and gait characteristics may be implemented.

To estimate a user's speed with a reduced level of noise/error, while also maintaining a high level of responsiveness to large and sudden changes in the user's speed, a custom estimator, such as a Kalman filter, is utilized. As inputs, the estimator utilizes a number of different types of observations/measurements, including one or more GNSS-derived speeds of the user and a step count of the user. In one implementation, for example, the Kalman filter utilizes a first observed speed that is derived from GNSS locations of the user, a second observed speed that is derived from Doppler shifts of the GNSS signals, and an observed step count of the user.

Due to the inherent properties of optimal estimators, such as Kalman filters, the estimation error for each of the estimator states (i.e., the estimates provided/output by the estimator) may be minimized. Much of the following description corresponds to an implementation in which a Kalman filter is used as the estimator. However, those skilled in the art will recognize that alternative optimal estimators, such as non-linear estimators, particle filters, etc., may also be used within the scope of the invention.

The states of the custom Kalman filter include characteristics of a gait model of the user, and possibly also one or more other characteristics relating to user movement (e.g., the user's speed). In some implementations, the gait model constitutes or includes a relation between the user's step frequency (cadence) and the user's step length. In one implementation, for example, the custom Kalman filter produces estimates of (1) the slope of a line representing cadence versus step length of the user, and (2) the x- or y-intercept of the line representing cadence versus step length of the user. For most individuals, step length varies considerably as a function of cadence. Moreover, step length and its relation to cadence typically change throughout the course of a run or walk based on various factors, such as the user's level of fatigue, and whether the user is running/walking on flat ground, or up or down a hill. By estimating parameters indicative of the relation between step length and cadence (e.g., in real-time), the custom Kalman filter may closely track such changes throughout the course of a run and/or walk. In some implementations, a user may be provided with this information on a display, and use the information to modify his or her gait and improve future performance.

A single user's gait characteristics (e.g., step length versus given cadence) can also vary greatly depending on whether the user is walking or running. To account for this difference, in some implementations, some or all of the Kalman filter states/estimates may be specific to a "walking" gait model of the user or a "running" gait model of the user, with the appropriate gait model being selected based on one or more factors (e.g., a current cadence indicating that the user is likely walking, or an accelerometer detecting impacts that are more consistent with running, etc.). Moreover, in some implementations, a process noise covariance of the custom Kalman filter can be dynamically adjusted based on one or more factors (e.g., whether the step count indicates the user has stopped, and/or whether at least some threshold level of speed change is measured, etc.). Dynamically changing the process noise covariance may generally serve to reduce the noisiness/error of the Kalman filter estimates when the user's pace is fairly constant, without overly degrading the responsiveness of the estimates to large and sudden changes in the user's speed. Other potential features and benefits of the invention are discussed below.

Example Systems

FIG. 1 is a block diagram of an example system 10 in which techniques for real-time estimation of a user's speed and gait characteristics may be implemented. The example system 10 includes a computing device 12 and three movement detection units 20, 22, 24. In some implementations, computing device 12 is a mobile computing device that a user wears or carries while walking or running. For example, computing device 12 may be a smartphone (e.g., held in the user's hand, or carried in an arm band or belt, etc.), or a wearable computing device such as a smart watch, smart glasses, or smart clothing. The computing device 12 may be a general-purpose computing device, or a dedicated device (e.g., a device dedicated entirely to fitness tracking). In other implementations, computing device 12 is a stationary or semi-stationary computing device, such as a desktop or laptop computer or a server. Examples of each of these alternative implementations will be discussed in more detail below.

In the example embodiment of FIG. 1, computing device 12 includes a processor 30, a memory 32, and a user interface 34. The processor 30 may be a single processor (e.g., a central processing unit (CPU)), or may include a set of processors (e.g., one or more CPUs and a graphics processing unit (GPU)). Memory 32 is a computer-readable, non-transitory storage unit or device, or collection of units/devices, that may include persistent (e.g., hard disk) and/or non-persistent memory components. Memory 32 stores instructions that are executable on processor 30 to perform various operations, including the instructions of various software applications, and the data generated and/or used by such applications. In the example implementation of FIG. 1, memory 32 stores at least an activity tracking application 40. Generally, and as discussed in more detail below, activity tracking application 40 is executed by processor 30 to track a user's running and/or walking performance based on measurements/observations provided by movement detection units 20, 22, 24.

User interface 34 includes hardware, firmware and/or software configured to enable a user to interact with (i.e., both provide inputs to and perceive outputs of) computing device 12. For example, user interface 34 may include a touchscreen with both display and manual input capabilities.

User interface 34 may also, or instead, include other types of components, such as a keyboard and monitor (with associated processing components) that provide input/output capabilities to the user.

Each of movement detection units 20, 22, 24 is worn and/or carried by the user, and observes (e.g., detects or senses) movements of the user and generates parameters indicative of that movement. In one implementation, for example, movement detection unit 20 uses GNSS signals to determine locations of the user, and to generate user speed values based on changes in those locations over time, movement detection unit 22 uses Doppler shifts in GNSS signals to generate other, independent user speed values, and movement detection unit 24 detects user steps and provides a step count of the user.

Each of movement detection units 20, 22, 24 may include hardware components and/or software components, and may be external to computing device 12 or integrated within computing device 12. External movement detection units may communicate with computing device 12 via a wired or wireless (e.g., Bluetooth, WiFi, etc.) network interface of computing device 12 (not shown in FIG. 1). In implementations where computing device 12 is a smartphone or smart watch and movement detection unit 24 is a step counter, for example, movement detection unit 24 may be a foot-mounted accessory device that communicates with computing device 12 via Bluetooth, or an accelerometer component with computing device 12. Generally, movement detection units 20, 22, 24 may be implemented on any device worn or carried by the user in any location (e.g., hand, wrist, arm, waist-band, etc.). In one implementation, for example, an accelerometer and/or step counter are implemented on a device worn by the user on his or her wrist, arm, waist-band, or any other suitable location.

While three distinct movement detection units are shown in FIG. 1, other implementations may include more (e.g., four, five, etc.) or fewer (two) such units, and/or two or more of the movement detection units may be included in a single device or component. In one implementation where movement detection unit 22 provides a speed derived from GNSS locations and movement detection unit 24 provides a speed derived from GNSS Doppler shifts, for example, both movement detection unit 22 and movement detection unit 24 are included in a single GNSS-capable device external to computing device 12, or in a single GNSS component of computing device 12 (e.g., if computing device 12 is a smartphone or smart watch).

As noted above, computing device 12 may be a stationary or semi-stationary computing device, such as a desktop computer, laptop computer, or server. For example, computing device 12 may be a server that is remote from the user and movement detection units 20, 22, 24. In such an embodiment, each of movement detection units 20, 22, 24 may include a network interface that communicates with a network interface of computing device 12 via a wireless (or partially wireless) network not shown in FIG. 1 (provided that the user has expressly agreed to share his or her data). As just one specific example, the network may include a cellular network, the Internet, and a server-side LAN. Alternatively, some or all of movement detection units 20, 22, 24 may communicate (e.g., via wired connections and/or Bluetooth) with a mobile computing device not shown in FIG. 1, and that mobile computing device may communicate with the remote computing device 12 via the network to relay the measurements/observations to computing device 12 (provided that the user has expressly agreed to share his or her data).

When executed by processor 30, activity tracking application 40 monitors the observations/measurements generated by movement detection units 20, 22, 24, and applies those observations/measurements (and/or values derived therefrom) as inputs to a Kalman filter 42. As noted above, other implementations may use a different type of estimator instead of a Kalman filter. The states of the Kalman filter 42 include an estimated speed 44 of the user and an estimated gait model 46 of the user. In other implementations, the estimated speed 44 is not included as a state of the Kalman filter 42. The estimated gait model 46 may include multiple parameters relating to the user's gait. In one implementation, for example, the estimated gait model 46 includes two parameters that are jointly indicative of the user's cadence as a function of the user's step length (e.g., slope and x- or y-intercept of a line that models the relation between cadence and step length). Example gait models are discussed further below in connection with FIG. 4.

Activity tracking unit 40 may pre-process one, some, or all of the observations/measurements from movement detection units 20, 22, 24 prior to applying those observations/measurements as inputs to the Kalman filter 42. Moreover, activity tracking unit 42 may dynamically adjust one or more parameters of the Kalman filter 42 itself (e.g., process noise covariance) during the course of a run and/or walk. Operation of the Kalman filter 42, along with some specific examples of pre-processing and dynamic parameter adjustment, are discussed in more detail below in connection with a specific implementation shown in FIG. 5.

In some implementations, the estimates (updated states) produced by the Kalman filter 42 and/or values derived therefrom (e.g., values of the estimated speed 44, step length versus time, one or more plots of the estimated gait model 46, etc.) are displayed to the user. Some or all of the information may be displayed in real-time as the user is running and/or walking (e.g., via user interface 34, if computing device 12 is a smartphone or wearable computing device). Alternatively, or in addition, some or all of the information may be displayed to the user after the run/walk is completed. For example, some or all the information may be displayed to the user when he or she later uses a web browser application of computing device 12 or another computing device (or activity tracking application 40, or another activity tracking application not shown in FIG. 1) to access a server that collects the estimates/states from computing device 12 (if the user has expressly agreed to share his or her data) and packages that data for display. Some example user displays are discussed below in connection with FIG. 6.

Figure 2:
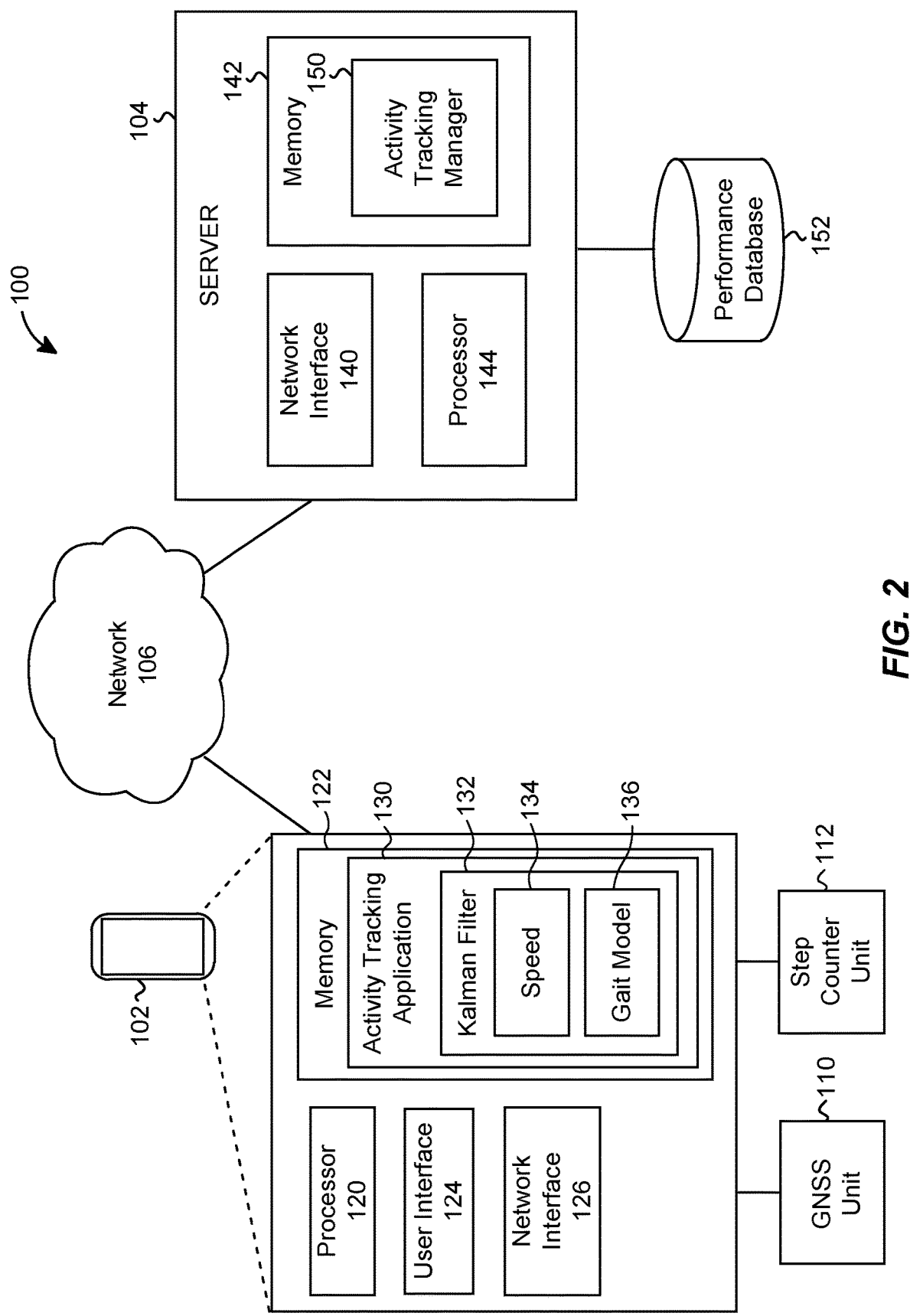
FIG. 2 is a block diagram of a first example implementation of the system of FIG. 1.
Figure 3:
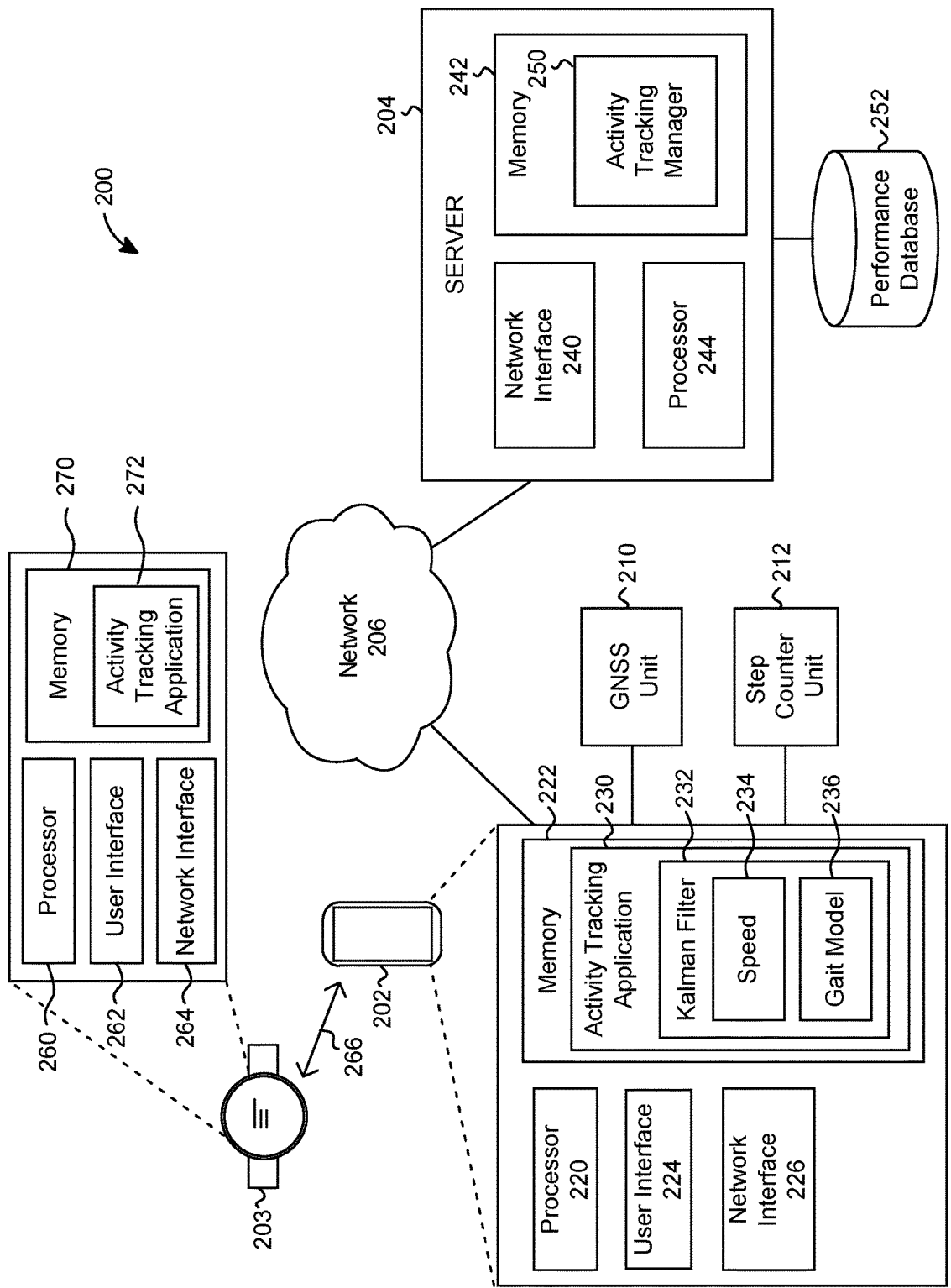
FIG. 3 is a block diagram of a second example implementation of the system of FIG. 1.

FIGS. 2 and 3 illustrate two alternative implementations of system 10 in which computing device 12 is a mobile computing device carried or worn by the user. Referring first to FIG. 2, a system 100 includes a mobile computing device 102, and a server 104 that is remote from mobile computing device 102 and communicatively coupled to mobile computing device 102 via a network 106. While FIG. 2 shows mobile computing device 102 as a smartphone, in other implementations mobile computing device 102 may be a smart watch, or another type of mobile computing device (e.g., smart glasses or smart clothing) worn or carried by a user. Moreover, while FIG. 2 shows only one mobile computing device 102, it is understood that server 104 may also be in communication with numerous other, similar mobile computing devices of other users. Further, while referred to herein as a "server," server 104 may, in some implementations, include multiple co-located or remotely distributed computing devices. Network 106 may include any suitable combination of one or more wired and/or wireless communication networks, such as one or more local area networks (LANs), metropolitan area networks (MANs), and/or wide area network (WANs). As just one specific example, network 106 may include a cellular network, the Internet, and a server-side LAN.

Mobile computing device 102 is communicatively coupled to a GNSS unit 110 and a step counter unit 112. GNSS unit 110 may be integrated within mobile computing device 102, or an external unit that is also worn or carried by the user (e.g., a GNSS unit within a smart watch of the user). In one implementation, GNSS unit 110 provides observed values of speeds that are derived from GNSS signals. For example, in an implementation where GNSS unit 110 corresponds to movement detection unit 20 of FIG. 1, GNSS unit 110 may calculate speed based on GNSS locations of the user, and provide those speed observations to mobile computing device 102. As another example, in an implementation where GNSS unit 110 corresponds to both movement detection unit 20 and movement detection unit 22 of FIG. 1, GNSS unit 110 may calculate a first speed based on GNSS locations of the user and a second speed based on Doppler shifts of GNSS signals, and provide both speed observations to mobile computing device 102.

Like GNSS unit 110, step counter unit 112 may be integrated within mobile computing device 102, or an external unit that is worn or carried by the user (e.g., a device physically mounted on or otherwise coupled to the user's hip, arm or foot). The step counter unit 112 may include an accelerometer, a magnetic pendulum, and/or any other hardware and/or software suitable for detecting steps. In different implementations, step counter unit 112 may provide a cumulative step count to mobile computing device 102, or may provide a single count (i.e., a step detection signal) that can be added to a total step count maintained by mobile computing device 102.

Mobile computing device 102 includes a processor 120, a memory 122, a user interface 124, and a network interface 126. Processor 120, memory 122, and user interface 124, may be similar to processor 30, memory 32, and user interface 34 of FIG. 1, for example. Network interface 126 includes hardware, firmware and/or software configured to enable mobile communications device 102 to exchange electronic data with server 104 via network 106. For example, network interface 126 may include cellular and/or WiFi transceivers.

Memory 122 stores an activity tracking application 130, which implements a custom Kalman filter 132 having an estimated speed 134 and an estimated gait model 136 as filter states. Activity tracking application 130 and the Kalman filter 132 may be similar to activity tracking application 40 and Kalman filter 42, respectively, of FIG. 1, for example.

Server 104 includes a network interface 140, a memory 142, and a processor 144. Network interface 140 includes hardware, firmware and/or software configured to enable server 104 to exchange electronic data with mobile computing device 102 and other, similar mobile computing devices (not shown in FIG. 2) via network 106. For example, network interface 140 may include a wired or wireless router and a modem.

Memory 142 is a computer-readable, non-transitory storage unit or device, or collection of units/devices, that may include persistent (e.g., hard disk) and/or non-persistent memory components. Memory 142 stores the software instructions of an activity tracking manager 150, and processor 144 includes one or more processors configured to execute those instructions. In operation, if the user has expressly agreed to share his or her data, activity tracking application 130 may cause mobile computing device 102 to transmit estimated speeds and gait model parameters to server 104 (e.g., in real-time as those parameters are estimated, or during a post-activity session upload process supported by activity tracking application 130, etc.). Activity tracking manager 150 may store the received data in a performance database 152 (e.g., along with metadata that associates the data with an account of the user of mobile computing device 102). The performance database 152 may be stored in memory 142 or another suitable memory. When the user accesses his or her account (e.g., via a web browser application, activity tracking application 130, and/or another dedicated application), he or she may view the estimated parameters (e.g., instantaneous speed and step length as a function of time over the course of a run/walk), parameters that are calculated based on the estimated parameters, and/or other parameters (e.g., a cadence versus time that is derived directly from the step count provided by step counter unit 112).

In some implementations, system 100 does not include server 104. For example, activity tracking manager 150 may be a component of activity tracking application 130, and/or performance database 152 may be stored in memory 122. In another alternative implementation, activity tracking application 130 is instead stored in memory 142 of server 104. For example, GNSS unit 110 and step counter unit 112 may include respective network interfaces that permit communication with server 104 (or may communicate with server 104 via mobile computing device 102) and, if the user has expressly agreed to share his or her data, server 104 may generate values of the estimated speed 134 and estimated gait model 136 rather than mobile computing device 102. In such an implementation, server 104 may transmit the estimated parameters (and/or values derived therefrom) to mobile computing device 102 for display to the user in real time via user interface 124, and/or the user may access server 104 (via a web browser application or dedicated application) after a run/walk to view his or her performance.

Referring next to FIG. 3, a system 200 includes a first mobile computing device 202 (e.g., a smartphone), a second wearable computing device 203 (e.g., a smart watch), and a server 204 that is remote from both mobile computing device 202 and mobile computing device 204. Server 204 is communicatively coupled to mobile computing device 202 via a network 206, which may be similar to network 106 of FIG. 2. While FIG. 3 shows mobile computing device 202 as a smartphone and mobile computing device 203 as a smart watch, in other implementations mobile computing device 202 may be a different mobile computing device (e.g., a smart watch) and/or mobile computing device 203 may be a different mobile computing device (e.g., smart glasses or other wearable electronics). Moreover, while FIG. 3 shows only one pair of mobile computing devices 202, 203, which are carried by and/or worn by a single user, it is understood that server 204 may also be in communication with numerous other, similar mobile computing devices of numerous other users. Further, while referred to herein as a "server," server 204 may, in some implementations, include multiple co-located or remotely distributed computing devices.

Mobile computing device 202 includes, or is coupled to, a GNSS unit 210 and a step counter 212, which may be similar to the like-named elements of FIG. 2, and includes a processor 220, memory 222, user interface 224, and network interface 226, which also may be similar to the like-named elements shown in FIG. 2. Moreover, activity tracking application 230, the Kalman filter 232, the estimated speed 234, and the estimated gait model 236 may be similar to the like-named elements shown in FIG. 2, except as discussed below with respect to operation of the system 200.

Server 204 includes a network interface 240, memory 242, and processor 244, which may be similar to the like-named elements in FIG. 2. Moreover, memory 242 may store an activity tracking manager 250, which may be similar to the like-named element of FIG. 2. Performance database 252 may be similar to performance database 152 of FIG. 2, and may or may not be stored in memory 242.

Mobile computing device 203 includes a processor 260, a user interface 262, a network interface 264, and a memory 270. The processor 260 may be a single processor (e.g., a single CPU), or may include a set of processors (e.g., one or more CPUs and a GPU). User interface 262 includes hardware, firmware and/or software configured to enable a user to interact with (i.e., both provide inputs to and perceive outputs of) mobile computing device 203. For example, user interface 262 may include a touchscreen with both display and manual input capabilities. User interface 262 may also include other components, such as a microphone (with associated processing components) that provides voice control/input capabilities to the user, one or more physical input keys or buttons, and so on.

Network interface 264 includes hardware, firmware and/or software configured to enable mobile computing device 203 to exchange electronic data with mobile computing device 202 via a short range link 266. For example, network interface 264 and network interface 226 may each include a Bluetooth transceiver. In other implementations, other short range technologies are instead used (e.g., WiFi, RFID, etc.).

Memory 270 is a computer-readable, non-transitory storage unit or device, or collection of units/devices, that may include persistent and/or non-persistent memory components. Memory 270 stores instructions that are executable by processor 260 to perform various operations, including the instructions of various software applications, and the data generated and/or used by such applications. In the example implementation of FIG. 3, memory 270 stores activity tracking application 272. Activity tracking application 272 acts in tandem with activity tracking application 230 of mobile computing device 202. For example, as the Kalman filter 232 of activity tracking application 230 generates values of the estimated speed 234 and estimated gait model 236, mobile computing device 202 may transmit those values to mobile computing device 203 (via short range link 266), and activity tracking application 272 may cause user interface 262 to display the real-time values to the user as the user runs/walks. In some implementations, activity tracking application 272 also, or instead, supports one or more user control functions. For example, activity tracking application 272 may cause user interface 262 to display an interactive control that, when activated by the user, pauses tracking of the user's run/walk (e.g., by communicating the activation to mobile computing device 202 via short range link 266, in response to which activity tracking application 230 pauses tracking).

In some implementations, system 200 does not include server 204. For example, activity tracking manager 250 may be a component of activity tracking application 230, and/or performance database 252 may be stored in memory 222. In another alternative implementation, activity tracking application 230 is instead stored in memory 270 of mobile computing device 203 (in place of activity tracking application 272). For example, mobile computing device 202 may receive data from GNSS unit 210 and step counter unit 212, and transmit that data to mobile computing device 203 via short range link 266 as the data is received to allow mobile computing device 203 to generate real-time gait model parameter, speed, and/or other estimates.

In yet another alternative implementation, activity tracking application 230 is instead stored in memory 242 of server 204. For example, GNSS unit 210 and step counter unit 212 may include respective network interfaces that permit communication with server 204 (or may communicate with server 204 via mobile computing device 202) and, if the user has expressly agreed to share his or her data, server 204 may generate values of the estimated speed 234 and estimated gait model 236 rather than mobile computing device 202. In such an implementation, server 204 may transmit the estimated parameters (and/or values derived therefrom) to mobile computing device 202 for display to the user in real time via user interface 224 and/or user interface 262, and/or the user may access server 204 (via a web browser application or dedicated application) after a run/walk to view his or her performance.

Example Gait Models

As noted above, the estimated gait model (e.g., gait model 46 of FIG. 1, gait model 136 of FIG. 2, or gait model 236 of FIG. 3) may represent various characteristics of a user's gait. Moreover, because the characteristics of a user's gait may change considerably depending on whether the user is running or walking, the activity tracking application (e.g., activity tracking application 40 of FIG. 1, activity tracking application 130 of FIG. 2, or activity tracking application 230 of FIG. 3) may, in some implementations, select a "running" gait model or a "walking" gait model as the model to be updated/estimated by the custom Kalman filter (e.g., Kalman filter 42 of FIG. 1, Kalman filter 132 of FIG. 2, or Kalman filter 232 of FIG. 3) at any given time.

Figure 4:
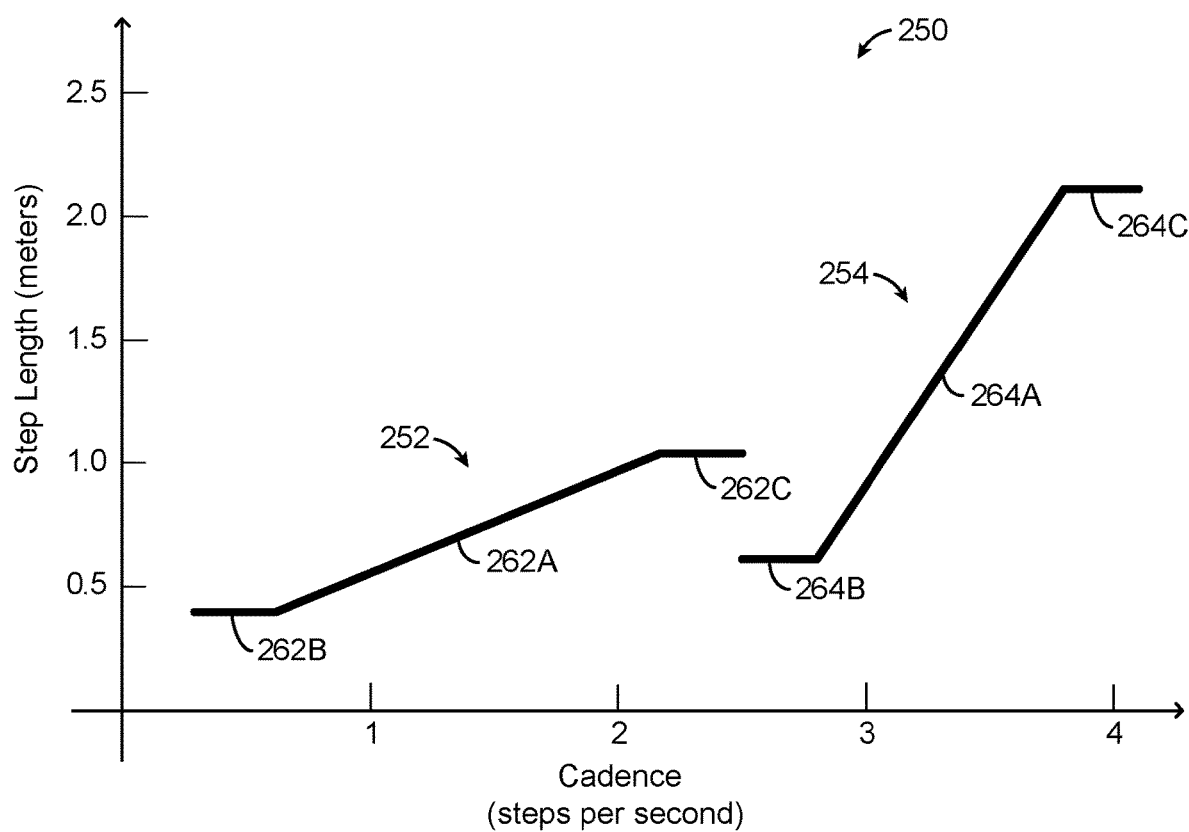
FIG. 4 depicts an example set of gait models for a single user that may be generated, updated, and/or displayed using the example system of FIG. 1, FIG. 2, or FIG. 3.

FIG. 4 depicts an example set 250 of gait models for a single user, including a walking gait model 252 and a running gait model 254. The walking gait model 252 is associated with a first region 262A in which step length increases as cadence increases, a second region 262B in which step length is constant over a range of cadences, and a third region 262C in which step length is constant over another range of cadences. Similarly, the running gait model 254 is associated with a first region 264A in which step length increases as cadence increases, a second region 264B in which step length is constant over a range of cadences, and a third region 264C in which step length is constant over another range of cadences. Thus, the example gait models 252, 254 both include non-linearities. In other implementations, the gait models 252, 254 do not attempt to capture the limits of step length and/or cadence, and are purely linear. In some implementations, the gait models may be quadratic functions or other functions that can be represented by polynomials, exponential functions, logarithmic functions, or combinations thereof.

As seen in FIG. 4, both the walking gait model 252 and the running gait model 254 show that the user's step length generally increases as the user's step frequency (cadence) increases. However, the range of step lengths, the range of cadences, and the slope of the relation between the two, varies significantly between the two models. While the example gait models 252, 254 in FIG. 3 do not overlap along the x-axis, overlap is possible in other implementations and/or scenarios.

In one implementation, the gait model parameters estimated by the custom Kalman filter (e.g., for gait model 46 of FIG. 1, gait model 136 of FIG. 2, or gait model 236 of FIG. 3) include parameters that are jointly indicative of the linear, sloped portion of the gait model (e.g., region 262A or 264A in FIG. 4, depending on which gait model is currently in use). For example, the gait model parameters may include, or consist entirely of, the slope and x- or y-intercept of the sloped line portion.

When the activity tracking application determines that the user has changed from running to walking, or vice versa, the old gait model may be stored in cache memory (e.g., within memory 32 of FIG. 1, memory 122 of FIG. 2, or memory 222 of FIG. 3), and the new gait model may be loaded from the cache memory. The manner in which the activity tracking application determines whether the user is running or walking at any given time may vary depending on the implementation. In one implementation, for example, the activity tracking application determines that the user is walking if he or she currently has a cadence, as derived from observed step counts over known time intervals, that is less than a threshold cadence (e.g., below 2.5 steps per second in the scenario of FIG. 4), and determines that the user is running if he or she currently has a cadence that is above the threshold cadence. In an alternative implementation, the determination is made based on the magnitude of measurements made by an accelerometer (e.g., a same accelerometer used to measure step count, as discussed above in connection with FIG. 1 through 3). For example, the activity tracking application may determine that the user is running if acceleration magnitude (or an average magnitude level, etc.) is above a threshold level, and instead determine that the user is walking if acceleration magnitudes (or an average magnitude level, etc.) is below the threshold level. Hysteresis of thresholds (for cadence or acceleration) may be used to prevent rapid bouncing between gait models. Other suitable techniques may also, or instead, be used. For example, the activity tracking application may base the gait model selection on acceleration magnitudes, or patterns in acceleration magnitudes, as well as one or more other factors (e.g., lateral acceleration, vertical acceleration, cadence, etc.). In some implementations, machine learning is used to determine, based on three-dimensional acceleration and/or other measurements, which combinations of measurement values and/or ranges are indicative of walking versus running for a particular user.

In other implementations, the set 250 includes only a single gait model that is always employed by the custom Kalman filter, or includes more than two gait models. For example, in addition to gait models 252 and 254, a third gait model may be used when the activity tracking application determines that the user is "jogging" (running slowly), or "power walking," etc. Moreover, in some implementations, gait models 252, 254 may be differ than those shown in FIG. 4. As just one example, gait models 252, 254 may still be indicative of step length versus cadence, but may accomplish this by plotting step length versus the inverse of cadence (i.e., step period).

Example Processing for Custom Kalman Filter

Figure 5:
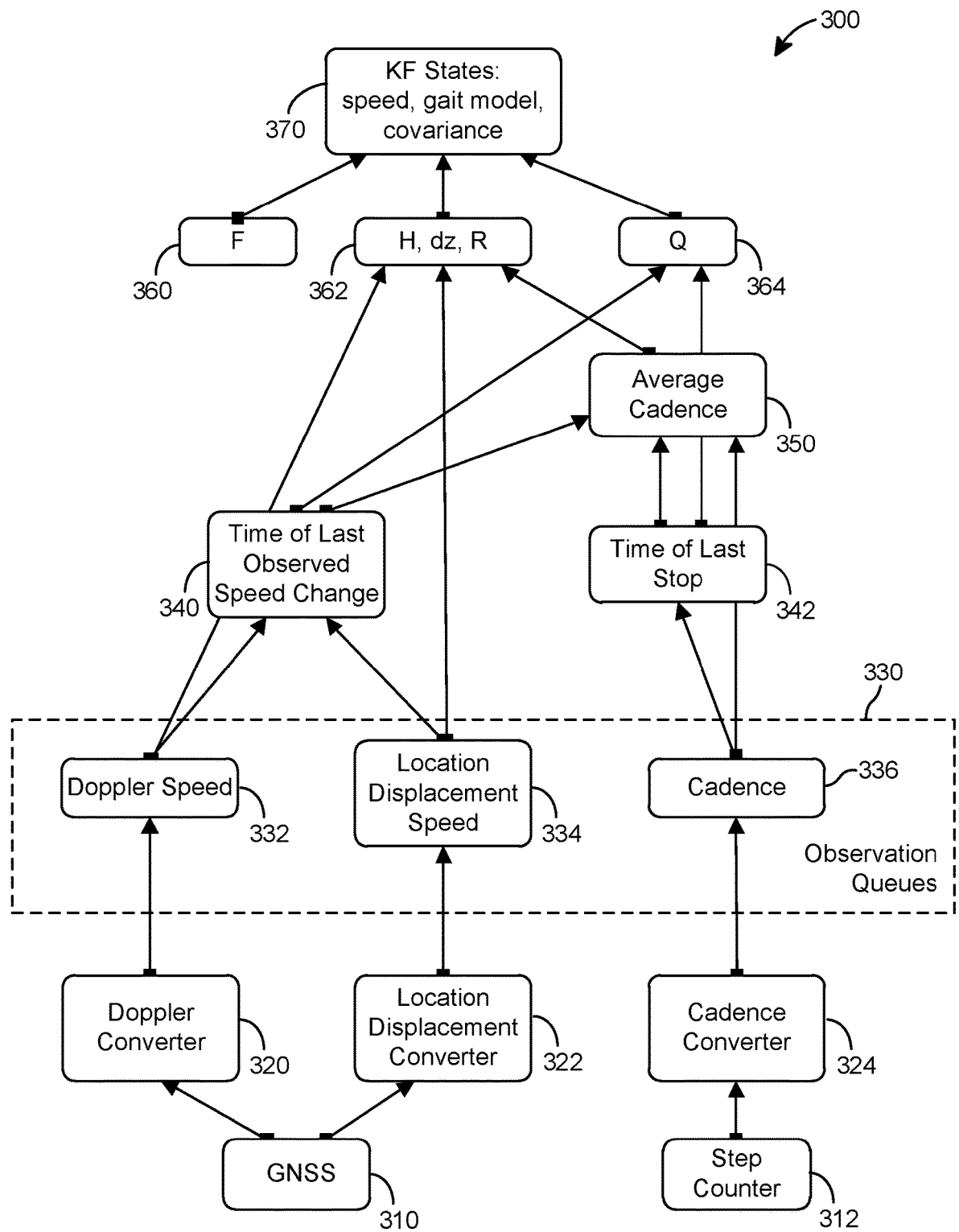
FIG. 5 is a data flow diagram of an example process for real-time estimation of a user's speed and gait characteristics.

FIG. 5 is a data flow diagram of an example process 300 for real-time estimation of a user's speed and gait characteristics. The process 300 may be implemented in whole or in part by activity tracking application 40 of FIG. 1, activity tracking application 130 of FIG. 2, or activity tracking application 230 of FIG. 3, for example. It is understood that the process 300 represents just one possible implementation, and that numerous other implementations are within the scope of the invention.

The process 300 corresponds to the operation of a custom Kalman filter (e.g., Kalman filter 42 of FIG. 1, Kalman filter 132 of FIG. 2, or Kalman filter 232 of FIG. 3), along with associated pre-processing of observation/measurement data, according to one implementation. Before addressing the flow of data shown in FIG. 5, the custom Kalman filter (corresponding to the specific implementation of process 300) is described. A system model for the Kalman filter can be expressed as:

$$x_k = F_k x_{k-1} + w_k \quad \text{(Equation 1)}$$

$$z_k = H_k x_k + v_k \quad \text{(Equation 2)}$$

$$w_k = N(0, Q_k) \quad \text{(Equation 3)}$$

$$v_k = N(0, R_k) \quad \text{(Equation 4)}$$

In Equations 1 through 4, k represents the time, with each integer increment to k representing a next time interval (e.g., the next half second, the next second, the next two seconds, etc., depending on the implementation). Also in Equations 1 through 4, $x_k$ is a vector representing the Kalman filter state at time k, $F_k$ is a matrix representing the Kalman filter state transition model at time k, $w_k$ is a vector representing the process noise at time k (here, a normal distribution with a mean of zero and a covariance of $Q_k$), $z_k$ is a vector representing the observation (input to the Kalman filter) at time k, $H_k$ is a matrix representing the observation model at time k (i.e., the mapping of the measurement/observation to the Kalman filter state), and $v_k$ is a vector representing the observation noise at time k (here, a normal distribution with a mean of zero and a covariance of $R_k$). The "process noise" $w_k$ represents parameters that have an effect on the estimates/states but are not directly captured in the system model (in this case, acceleration), and the "observation noise" $v_k$ represents noise in the measurements/observations that are input to the Kalman filter.

In the example process 300, the Kalman filter state $x_k$ is a vector with three elements: the user's true speed (s), the slope of the user's gait model (m), and the y-intercept of user's gait model (n), where the gait model includes a line representing step length as a function of cadence. In an embodiment where the observation model $H_k$ of Equation 2 is not a linear function (e.g., as seen below in Equations 18 and 19), the custom Kalman filter is an extended Kalman filter, such that Equation 2 is replaced with the following equation:

$$z_k = h(x_k) + v_k \quad \text{(Equation 5)}$$

The Kalman filter of the process 300 assumes, for purposes of the prediction, that the user's speed and gait model parameters do not change from one time increment to the next. This assumption results from the fact that the Kalman filter of the process 300 does not model acceleration. To reflect this assumption, $F_k$ is a 3×3 identity matrix that is fixed for all values of k.

The Kalman filter operation generally includes two steps/stages per time interval (i.e., per k value): an a priori prediction step, and an a posteriori update step. In the prediction step, the Kalman filter generates a prediction of the next state x and the state covariance P based on the system model at time k−1, as follows:

$$\hat{x}_{k|k-1} = F_k \hat{x}_{k-1|k-1} \quad \text{(Equation 6)}$$

$$P_{k|k-1} = F_k P_{k-1|k-1} F_k^T + Q_k \quad \text{(Equation 7)}$$

The state covariance P can be viewed as a measure of the uncertainty in the prediction of Equation 6. Because $F_k$ is an identity matrix, Equations 6 and 7 result in the predicted state being the same as the previous state estimate, and the state covariance being the previous state covariance plus the covariance $Q_k$ (which captures the extent to which the state might have further changed since the last time interval). In the process 300, the covariance $Q_k$ of the process noise $w_k$ may be dynamically set to reflect the level of uncertainty that results from acceleration not being modeled by the system, as is discussed further below.

After the prediction step, in the a posteriori update step, the estimations are updated based on the current (time k) observations as follows:

$$\hat{x}_{k|k} = \hat{x}_{k|k-1} + K_k dz_k \quad \text{(Equation 8)}$$

$$P_{k|k} = (I - K_k H_k) P_{k|k-1} (I - K_k H_k)^T + K_k R_k K_k^T \quad \text{(Equation 9)}$$

In Equations 8 and 9, $K_k$ the Kalman filter gain (a scalar value) at time k, $d_{zk}$ is a vector representing the observation residual at time k, and I is an identity matrix. The Kalman filter gain $K_k$, the observation residual $d_{zk}$, and a residual covariance ($S_k$) that is used to calculate the Kalman filter gain are calculated as follows:

$$K_k = P_{k|k-1} H_k^T S_k^{-1} \quad \text{(Equation 10)}$$

$$dz_k = z_k - H_k \hat{x}_{k|k-1} \quad \text{(Equation 11)}$$

$$S_k = H_k P_{k|k-1} H_k^T + R_k \quad \text{(Equation 12)}$$

Thus, the observation residual $d_{zk}$ is the difference between the measurement $z_k$ and the expected measurement $H_k \hat{x}_{k|k-1}$. By virtue of being a multiplier of $d_{zk}$ in Equation 8, the Kalman filter gain $K_k$ determines the extent to which new measurements (more precisely, differences between new measurements and expected measurements) will affect the current estimate of the state, $\hat{x}_{k|k}$. The new/current state estimate $\hat{x}_{k|k}$ is the output of the Kalman filter at time k (i.e., in this implementation, the new speed, gait model slope, and gait model intercept). $\hat{x}_{k|k}$ is also stored for use in the prediction step of the next time interval, at which point $\hat{x}_{k|k}$ will be used as the quantity $\hat{x}_{k-1|k-1}$ in Equation 6. As seen in Equation 9, the Kalman filter gain $K_k$ also determines the extent to which the state covariance prediction $P_{k|k-1}$ and the observation noise covariance $R_k$ will affect the current covariance $P_{k|k}$. The new/current covariance $P_{k|k}$ is also stored for use in the prediction step of the next time interval, at which point $P_{k|k}$ will be used as the quantity $P_{k-1|k-1}$ in Equation 7.

The example process 300 corresponds to an implementation in which three observations/measurements are input to the Kalman filter: a first user speed derived from Doppler shifts of the GNSS signals, a second user speed derived from the GNSS locations, and a user cadence (e.g., as calculated based on a measured step count of the user and a known time interval). As seen in Equation 2 above, $H_k$ maps the measurement/observation $z_k$ to the Kalman filter state $x_k$. Each of the three different kinds of measurements (Doppler-based speed, location-based speed, step count-based cadence) is associated with its own $H_k$. If $x_k$ is expressed as a column vector [s m n] (k), then:

$$H_k(\text{Doppler}) = [1 \ 0 \ 0] \quad \text{(Equation 13)}$$

$$H_k(\text{location}) = [1 \ 0 \ 0] \quad \text{(Equation 14)}$$

Thus, Equations 13 and 14 cause the respective measured/observed speed to be mapped directly to the speed s of state $x_k$.

For the cadence measurement (or, as discussed below, an average cadence determined from the cadence measurement), $H_k$ is more complex. When the calculated step length is in the range of the gait model that has a non-zero slope (e.g., region 262A or 264A of FIG. 4), the following equations hold true:

$$\frac{s}{z_{cadence}} = \text{step length} = m * z_{cadence} + n \quad \text{(Equation 15)}$$

$$s = m * z_{cadence}^2 + n * z_{cadence} \quad \text{(Equation 16)}$$

$$m * z_{cadence}^2 + n * z_{cadence} - s = 0 \quad \text{(Equation 17)}$$

In this case, the observation function is quadratic:

$$z_{cadence} = h(s, m, n) = \frac{-n + \sqrt{n^2 + 4m*s}}{2m} \quad \text{(Equation 18)}$$

To simplify the solution of Equation 18, an approximation may be made by taking the gradient of h(s,m,n) at $\hat{x}_{k|k}$ (i.e., a Taylor series around the most recent state estimation):

$$H_k(\text{cadence}) = h'(\hat{x}_{k|k}) = h'(s_k, m_k, n_k) = \left[\frac{\partial h}{\partial s}, \frac{\partial h}{\partial m}, \frac{\partial h}{\partial n}\right] \quad \text{(Equation 19)}$$

$$\frac{\partial h}{\partial s} = \frac{1}{g} \quad \text{(Equation 20)}$$

$$\frac{\partial h}{\partial m} = \frac{s}{m*g} - \frac{g-n}{2m^2} \quad \text{(Equation 21)}$$

$$\frac{\partial h}{\partial n} = \frac{1}{2m}\left(\frac{n}{g} - 1\right) \quad \text{(Equation 22)}$$

For Equations 20 through 22, g is defined as:

$$g = \sqrt{n^2 + 4m*s} \quad \text{(Equation 23)}$$

When the calculated step length is instead in a range of the gait model that has zero slope (e.g., in region 262B, 262C, 264B, or 264C of FIG. 4), step length is constant ($c_{sl}$) and cadence is:

$$\text{cadence} = \frac{s}{c_{sl}} \quad \text{(Equation 24)}$$

In this scenario, the $H_k$(cadence) to map the cadence measurement to speed is simply:

$$H_k(\text{cadence}) = \left[\frac{\partial h}{\partial s}, 0, 0\right] = \left[\frac{1}{c_{sl}}, 0, 0\right] \quad \text{(Equation 25)}$$

To avoid instability (or cadence being stuck at a constant value) due to g or m approaching zero, both g and/or m may be constrained by lower bound values.

As noted above, in the process 300, the observation noise $v_k$ has a normal distribution with a mean of zero and a covariance of $R_k$. As seen from Equations 10 and 12, the covariance $R_k$ is used to calculate the Kalman filter gain $K_k$. Moreover, as seen from Equations 10 and 12, a larger covariance $R_k$ results in a smaller Kalman filter gain $K_k$. Thus, a noisier observation generally causes the observation to have less effect on the state.

The value of $R_k$ may reflect a different amount of uncertainty for each of the three types of observations in the process 300 (i.e., Doppler-based speed, location-based speed, and step count-based cadence). For the Doppler-based speed, the activity tracking application may set $R_k$(Doppler) to a fixed covariance value (e.g., 0.36 m²/s²) that makes certain assumptions about the level of measurement noise. In other implementations, the source of the Doppler-derived speed (e.g., movement detection unit 22 of FIG. 1, GNSS unit 110 of FIG. 2, or GNSS unit 210 of FIG. 3) may provide $R_k$(Doppler), either as a fixed or dynamically changing value. In one implementation, $R_k$(Doppler) may be set equal to (or otherwise derived from) the variance observed in Doppler-derived speed samples over some period of time (e.g., the most recent 10 seconds), with the variance being measured and/or calculated by the activity tracking application and/or the source of the Doppler-derived speed.

For the location-based speed, the activity tracking application may calculate $R_k$(location) based on variances in the location ($\sigma_1^2$ for a first dimension and $\sigma_2^2$ for a second dimension). For example, for locations $l_1$ and $l_2$, measured across a time differential dt, the speed may be calculated as $$\frac{(l_1 - l_2)}{dt},$$

and $R_k$(location) may be approximated as:

$$R_k(\text{location}) = \left(\frac{\sigma_1^2 + \sigma_2^2}{dt^2}\right) cf^2 + (uf * \text{speed})^2 \quad \text{(Equation 26)}$$

In Equation 26, $cf^2$ is a correlation factor, which is indicative of the strength of correlations between the GNSS location measurements $l_1$ and $l_2$ (e.g., where the locations are offset from the true locations in a consistent direction and by a consistent amount). In some implementations, $l_1$ and $l_2$ are not adjacent measurements, but instead are separated by some predetermined amount of time (e.g., 10 seconds). This may generally reduce the amount of observation noise corresponding to the location-derived speed measurements. The activity tracking application may set the correlation factor to a fixed value (e.g., 0.25), or the source of the location-derived speed (e.g., movement detection unit 20 of FIG. 1, GNSS unit 110 of FIG. 2, or GNSS unit 210 of FIG. 3) may provide the correlation factor, either as a fixed or dynamically changing value. Also in Equation 26, uf is a path uncertainty factor, which reflects the fact that it becomes less and less likely that the user took a straight path between two locations as those locations become further apart. The activity tracking application may set or calculate the path uncertainty factor based on the distance between locations, or the source of the location-derived speed (e.g., movement detection unit 20 of FIG. 1, GNSS unit 110 of FIG. 2, or GNSS unit 210 of FIG. 3) may provide the path uncertainty factor as a fixed or dynamically changing value.

For the cadence, the activity tracking application may assume that the step counter (from which cadence is derived) is highly accurate and reliable, with the worst case scenario being that the step counter misses the first and last step of a given time interval. Under this assumption, the activity tracking application may calculate $R_k$(cadence) as:

$$R_k(\text{cadence}) = \left(\frac{2}{dt}\right)^2 \quad \text{(Equation 27)}$$

In other implementations, the activity tracking application may receive values of $R_k$(cadence) from the source of the step counter measurements (e.g., movement detection unit 24 of FIG. 1, step counter unit 112 of FIG. 2, or step counter unit 212 of FIG. 3), as a fixed or dynamically changing value.

As was also noted above, in the process 300, the process noise $w_k$ has a normal distribution with a mean of zero and a covariance of $Q_k$. $Q_k$ reflects the uncertainty of the state estimation, and is used in the custom Kalman filter to control how much the state changes from the previous update. Generally, when $Q_k$ is smaller there is greater confidence as to the state estimation, and the state is updated more as a result of a new measurement. Conversely, when $Q_k$ is larger there is less confidence as to the state estimation, and the state is updated less as a result of a new measurement. Generally, a smaller $Q_k$ helps smooth the noise from the GNSS measurements but makes the state less responsive to actual changes in user speed, while a larger $Q_k$ provides less smoothing but makes the state more responsive to actual changes in user speed (i.e., allows the state estimate to converge to a the new speed more quickly).

In the example process 300, the process noise covariance is defined as follows:

$$Q_k = \begin{bmatrix} Q_s & 0 & 0 \\ 0 & Q_m & 0 \\ 0 & 0 & Q_n \end{bmatrix} (k) \quad \text{(Equation 28)}$$

$$Q_s = (accS * dt)^2 \quad \text{(Equation 29)}$$

$$Q_m = (accM * dt)^2 \quad \text{(Equation 30)}$$

$$Q_n = (accN * dt)^2 \quad \text{(Equation 31)}$$

One or more of the values accS, accM, and accN may be dynamically set based on various factors. In the example process 300, the value accS has a nominal value, but is set to a higher value if a stop has been detected or if a large and sudden speed change is detected. In one implementation, for example, accS is increased from a nominal value of 0.01 m/s² to a value of 0.3 m/s² if a stop was recently detected (for a predetermined amount of time, e.g., 15 seconds, 10 seconds, etc.), and is instead increased from the nominal value of 0.01 m/s² to a value of 0.05 m/s² if a large and sudden speed change is detected (e.g., only while the large speed change is occurring, or for some slightly longer period, etc.). In addition, or alternatively, accS may be set to a higher value (e.g., 0.3 m/s²) when a user has just started tracking activity (e.g., upon a "cold start"), and for some predetermined amount of time thereafter (e.g., 20 seconds), before decreasing to the nominal value. Techniques for detecting stops and large speed changes are discussed in further detail below with reference to FIG. 5.

Also in the example process 300, the value accM has a nominal value, but is set to a new value if the cadence is zero (or, in some implementations, if the cadence is below a low, predetermined threshold). For example, accM may have a nominal value of (0.1/120) during normal operation, but be lowered to zero if the cadence falls below a predetermined threshold. In one implementation, the value accN is a function of accM and/or the cadence. For example, accN may be set equal to the product of accM and the measured (or average cadence).

Referring again now to the data flow diagram shown in FIG. 5, it is seen that GNSS data 310 and step counter data 312 are provided as inputs to the process 300. The GNSS data 310 and step counter data 312 may include new observations/measurements each time interval (e.g., for each increment in the value of k in the discussion above). In some implementations, the process 300 is also designed to handle situations where some or all observations are missing for one or more time intervals, and/or where extra observations are made available. GNSS data 310 may be provided by a device or component such as GNSS unit 110 of FIG. 2 or GNSS unit 210 of FIG. 3, and step counter data 312 may be provided by a device or component such as step counter unit 112 of FIG. 2 or step counter unit 212 of FIG. 3, for example.

GNSS data 310 includes data indicative of two independent speed measurements: a first speed derived from Doppler shifts of GNSS signals, and a second speed derived from GNSS location displacements (e.g., distances between successive GNSS locations). Step counter data 312 includes data indicative of a number of steps taken by the user (e.g., a cumulative number of steps since a last measurement interval). At a process stage 320, the Doppler-derived speeds of GNSS data 310 are converted to a Doppler speed 332, which is added to speeds in a first queue of observation queues 330. At a process stage 322, the location-derived speeds of GNSS data 310 are converted to a location displacement speed 334, which is added to speeds in a second queue of observation queues 330. At a process stage 324, the step counter data 312 is converted to a cadence 336, which is added to cadences in a third queue of observation queues 330. Observation queues 330 generally retain a history of recent speed and cadence information, which can be used to identify times when it is likely that the user has quickly and substantially changed his or her speed (as discussed further below).

In some implementations, GNSS data 310 provides raw data (e.g., Doppler shift information and/or locations or location displacements), in which case process stage 320 and/or process stage 322 may perform the calculations needed to determine speed values. In other implementations, GNSS data 310 already includes the Doppler-derived and location-derived speed values. Process stage 324 may convert step counter data 312 into cadence values by dividing the number of steps in a predetermined time interval by the length of that time interval, for example. In implementations where step counter data 312 only includes an indication of each new step without a cumulative count (which can be viewed as "counting" up to one, with the count being reset to zero after each detected step), process stage 324 may also determine the cumulative step counts over the predetermined time interval. One, some, or all of process stages 320, 322, 324 may also, or instead, convert the received data into a format that is more amenable to later processing in the process 300.

At a process stage 340, the time of a last observed "large" speed change by the user is identified based on the Doppler speeds and/or location displacement speeds in observation queues 330. For example, both a mean and a standard deviation of Doppler speed measurements may be calculated based on the last i time intervals (e.g., the last 10 intervals, 100 intervals, etc.), and process stage 340 may detect when a new Doppler speed measurement (or an average of a certain number of the most recent measurements, etc.) is at least some threshold amount away from the mean (e.g., at least two standard deviations away from the mean, etc.). In some implementations, process stage 340 independently identifies the speed changes based on the queued Doppler speeds and the queued location displacement speeds in this manner, and only indicates a "valid" speed change if both sources indicate such a change. In other implementations, process stage 340 jointly applies an algorithm to both of these sources of queued data to determine when such a speed change occurs, only looks at one of these source of queued data, and/or additionally bases the determination of the time of the last large speed change on queued cadence data.

At a process stage 342, the time of a last stop by the user is identified based on the cadences in observation queues 330. For example, it may be determined that the user "stopped" only if there are zero steps (or less than a threshold number of steps, etc.) counted in the most recent time interval. In some implementations, other information is also, or instead, used to determine whether the user has stopped. For example, the process stage 342 may determine the user has stopped only if the most recent Doppler speed, location displacement speed, and cadences in observation queues 330 (or a certain number of the most recent values, etc.) all confirm that the user has stopped. In one implementation where the step counter cannot or does not wake up the activity tracking application (or the portion of the activity tracking application responsible for detecting stops), and where the step counter is only able to provide a report when the step count changes and some other trigger has woken the activity tracking application, stops are detected when both (1) the step counter has not provided an update for at least some threshold amount of time (e.g., 6 seconds) and (2) at least one of the GNSS Doppler speed and the GNSS location speed is below some threshold level (e.g., 0.5 m/s). The latter condition may be useful in preventing "false positives" (i.e., detected stops which did not actually occur), which are generally much more costly than false negatives in terms of estimation error.

At process stage 350, an average cadence is calculated based on cadence values in observation queues 330. In one implementation, the cadence is averaged over a predetermined window of time (e.g., 30 seconds), but not extending past the time of the last "large" speed change as detected by process stage 340, and not extending past the time of the last stop as detected by process stage 342. Put differently, the averaging window for the cadence may be set to a nominal time value or number of time intervals, but may be bounded at the upper end by the lesser of (1) the time since the last large speed change, and (2) the time since the last stop. This bounded averaging technique may help to prevent a skewed average cadence in the time periods immediately following a stop and/or a large speed change. In other implementations, the time averaging window is bounded in another manner (e.g., only by the time since the last stop), or is simply fixed at the nominal value.

Various parameters of the Kalman filter system model are shown in FIG. 5 as reference numbers 360, 362 or 364. Specifically, model parameter 360 represents the Kalman filter state transition model F, model parameters 362 represent the observation model H, the observation residual dz, and the observation noise covariance R, and model parameter 364 represents the process noise covariance Q. These parameters correspond to the parameters included in Equations 1 through 27 above (with subscripts k or k−1 in Equations 1 through 27 to indicate relative time intervals).

As noted above, the state transition model F (model parameter 360) is fixed in the example process 300. The parameters H, dz, and R (model parameters 362), on the other hand, can be affected by new observations/measurements, as is reflected in the above equations and the arrows from Doppler speed 332, location displacement speed 334, and average cadence 350 to model parameters 362 in FIG. 5. As was also noted above, the process noise covariance Q (model parameter 364) may normally be kept at a relatively low nominal value, but may be changed to higher values if a stop was recently detected or a large speed change is observed. In FIG. 5, this is reflected by the arrows from process stage 340 and process stage 342 to model parameter 364. In some implementations, process stage 340 can distinguish between two or more levels of "large" speed changes (e.g., one to two standard deviations from the mean corresponding to a first level of speed change, two to three standard deviations from the mean corresponding to a second level of speed change, etc.), and the model parameter 364 is set to a respective value based on the identified level of the speed change. The Kalman filter states are estimated at a process stage 370, based on the model parameters 360, 362, and 364, and as reflected in the equations above.

Example User Displays

The techniques described herein (e.g., in connection with system 10 of FIG. 1, system 100 of FIG. 2, system 200 of FIG. 3, and/or process 300 of FIG. 5) may, depending upon the specific implementation, be used to output information such as real-time, instantaneous speed, step length, and/or other information. For example, one or more of the states that are continuously updated by the process 300, and/or by the Kalman filter 42 of FIG. 1, the Kalman filter 132 of FIG. 2, or the Kalman filter 232 of FIG. 3, may be displayed to the user. Additionally, or alternatively, one or more parameters derived from one or more of those states may be displayed in real time. It is understood that, as used herein, the term "instantaneous" may be used to refer to parameters (e.g., speed) that are not precisely instantaneous, but rather involve some relatively small amount of averaging. For example, some averaging may be inherent to the techniques described herein if the GNSS speeds that are input to the Kalman filter are the product of smoothing techniques. Moreover, in some implementations, the techniques described herein themselves add some amount of smoothing or averaging (e.g., in the process 300 of FIG. 5, due to the averaging of the cadence at process stage 350, and/or if the GNSS speeds in observation queues 330 are averaged over a short time window prior to being input to the Kalman filter, etc.).

The real-time speed and/or other parameters may be displayed to the user while he or she is walking/running. For example, the activity tracking application may cause a user interface such as user interface 34 of FIG. 1, user interface 124 of FIG. 2, or user interface 262 (and/or user interface 224) of FIG. 3 to display the real-time parameter(s) to the user. In addition, or alternatively, speeds, gait model parameters, and/or other parameters that are continuously updated as Kalman filter states (and/or parameters derived therefrom) may be stored in a memory (e.g., memory 32 of FIG. 1, memory 122 and/or performance database 152 of FIG. 2, or memory 222, memory 270, and/or performance database 252 of FIG. 3) for later presentation (e.g., after the run/walk is completed and uploaded to server 104 of FIG. 2 or server 204 of FIG. 3, if the user has expressly agreed to share his or her data). As one example, if the user has expressly agreed to share his or her data, a server such as server 104 of FIG. 1 or server 204 of FIG. 2 may receive the data from a mobile computing device (e.g., mobile computing device 102 of FIG. 2 or mobile computing device 202 of FIG. 3) in response to the user selecting an interactive "upload" control provided by an activity tracking application (e.g., activity tracking application 130 of FIG. 2 or activity tracking application 230 of FIG. 3). Thereafter, the server may process the data into a format suitable for presentation on a graphical user interface (GUI), which the user can access by using a web browser application or a dedicated application at a different computing device (e.g., after entering a login and password).

Figure 6:
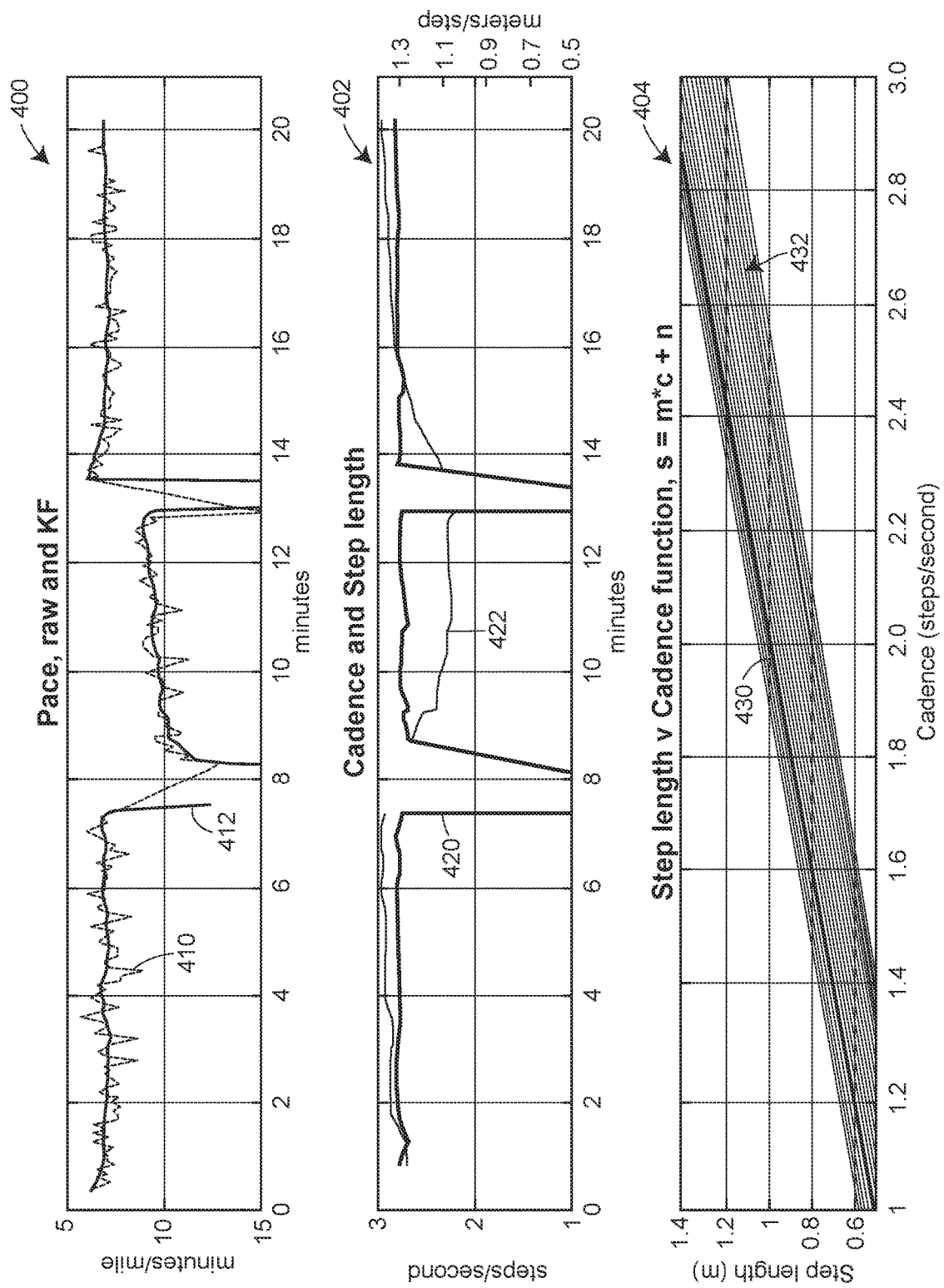
FIG. 6 depicts various plots that the example system of FIG. 1, FIG. 2, or FIG. 3 may present to a user.

An example presentation that may be generated, including three displays 400, 402, and 404, is shown in FIG. 6. The first display 400 plots the user's pace 412 (in minutes per mile) versus time over the course of an approximately 20 minute run, with breaks/rests around the eighth and thirteenth minutes. The pace 412 may be equal to (or derived from, e.g., the inverse of) a speed estimate that is a state of the Kalman filter in the process 300 at a number of different times, for example. Also seen in the display 400 is a GNSS pace 410, which may be equal to (or derived from) the Doppler-based GNSS speed or the location-based GNSS speed (or an average of the two, etc.), for example. The GNSS pace 410 may be omitted, and is shown here primarily to illustrate the potential improvement in noise level that the custom Kalman filter may provide, as well as the potential improvement in responsiveness (e.g., as seen by the steeper negative or positive slope when the user stops or starts).

The second display 402 in FIG. 6 plots both the user's cadence 420 (in steps per second) and the user's step length 422 (in meters per step) versus time over the course of the run/walk. The cadence 420 may be values of the average cadence calculated at process stage 350 of the process 300 at a number of different times, and the step length 422 may be calculated from values of the gait model parameters of the Kalman filter states (e.g., slope and intercept in the process 300) at a number of different times, and from the average cadence at those times, for example.

The third display 404 plots the user's gait model. The gait model 430 (a single line) may represent at least a portion of the user's average gait model (e.g., the average slope and intercept) over the course of the run/walk, and the numerous gait models 432 may represent the instantaneous gait model (or a portion thereof) at each of a number of different times within the run/walk. The gait models 432 may be plotted using the values of the slope and intercept states of the Kalman filter (in the process 300), as updated by the Kalman filter at a number of different times, for example. In some implementations where each user is associated with both a walking and a running gait model, the third display 404 may correspond to just the walking gait model, and a fourth display may show the user's running gait model (or the third display 404 may additionally show the running gait model, or the user may select which gait model is shown, etc.).

The display of accurate, instantaneous gait characteristics such as cadence and step length over time (display 402), and/or the display of a model such as the user's cadence versus the user's step length (display 404), may help the user to modify his or her gait in the future for improved running performance. Conventional approaches do not allow such displays (at least, step length versus time and the gait model versus time) to be presented with a comparable level of accuracy. It is understood that different units and/or inverse metrics may be used, such as minutes/kilometers for speed or pace (e.g., kilometers per hour, kilometers per minute, minutes per kilometer, etc.). Similarly, cadence and step length may be shown using different units and/or inverse metrics (e.g., step period instead of cadence).

Example Method

Figure 7:
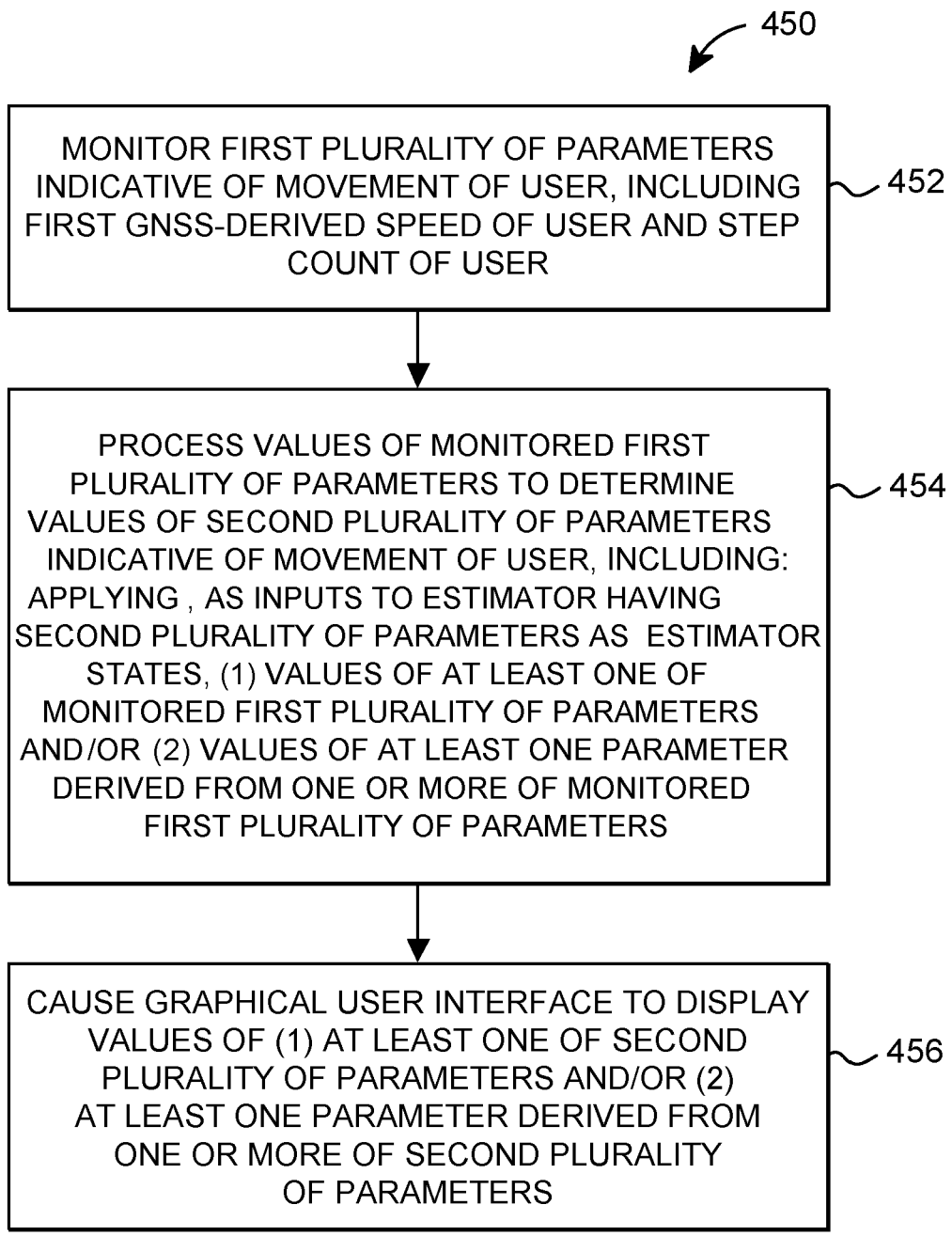
FIG. 7 is a flow diagram of an example method for accurately estimating gait characteristics of a user, according to one implementation.

An example method 450 for accurately estimating gait characteristics of a user, according to one implementation, is shown in FIG. 7. The method 450 may be implemented as instructions stored on a computer-readable medium and executed by one or more processors of a computing device. With reference to FIGS. 1 through 3, the method 450 may be implemented by activity tracking application 40, by activity tracking application 130, or by activity tracking application 230, for example.

At block 452, a first plurality of parameters is monitored over time. Each of the first plurality of parameters is indicative of movement of the user. The first parameters include a first GNSS-derived speed (e.g., a speed determined using GNSS location or GNSS Doppler shift) of the user and a step count of the user. The monitored step count may be a cumulative count, or may simply be an indication of each new step (which can be accumulated later, e.g., at block 454). In some implementations, one or more other parameters may also be monitored. In one implementation, for example, the first parameters include (or consist entirely of) a first speed that is determined using GNSS location, a second speed that is determined using GNSS Doppler shift, and a step count.

The first parameters may be monitored by receiving values of those parameters from external devices and/or from components integrated in the computing device implementing the method 450. In implementations where the computing device is a mobile computing device (e.g., a smartphone or smart watch), for example, block 452 may include receiving real-time data generated by one or more devices external to the mobile computing device (e.g., a device mounted on or near the foot), and/or receiving real-time data generated by one or more components of the mobile computing device (e.g., a GNSS unit and/or an accelerometer). As another example, in implementations where the computing device is a server remote from the user and the user has expressly agreed to share his or her data, block 452 may include receiving over a network (e.g., network 106 of FIG. 2 or network 206 of FIG. 3) real-time data generated by one or more mobile computing devices carried by the user (e.g., a smart phone and/or smart watch).

At block 454, values of the monitored first plurality of parameters are processed to determine values of a second plurality of parameters. Each of the second plurality of parameters is also indicative of movement of the user. The processing at block 454 includes applying, as inputs to an estimator (e.g., a Kalman filter), values of at least one of the monitored first parameters and/or values of at least one parameter that is derived from one or more of the monitored first parameters. The estimator states include the second parameters whose values are determined at block 454. That is, the values of the second parameters are determined via the estimation/updates provided by the estimator.

In one implementation, the second parameters include at least two parameters that are collectively indicative of a mapping between step frequency (cadence) of the user and step length of the user. For example, the second parameters may include a slope of a line representing the mapping between step frequency and step length of the user, and also an x- or y-intercept of that line. The second parameters may also, or instead, include a speed of the user, and/or one or more other parameters.

In certain implementations where the estimator is a Kalman filter, the processing at block 454 is performed partially or wholly in accordance with any one of the implementations of process 300 as discussed above in connection with FIG. 5. Thus, for example, the processing at block 454 may include predicting, at each of a plurality of time intervals, that values of the Kalman filter states are unchanged from respective values of the Kalman filter states at a most recent time interval, and/or dynamically setting values of a process noise covariance (Q) used by the Kalman filter. Moreover, dynamically setting values of the process noise covariance may include increasing the process noise covariance when at least the step count of the user indicates the user has stopped, and/or increasing the process noise covariance when at least the first GNSS-derived speed of the user indicates the user has accelerated or decelerated (and thus, increased/decreased speed) by more than a threshold amount. As another example, the processing at block 454 may include determining an average cadence over a window of time intervals, where the upper window length is bounded by the minimum of (1) a predetermined maximum window length, (2) a time since the last user stop was detected, and/or (3) a time since the last "large" user speed change (e.g., of at least some threshold amount) was detected.

At block 456, a GUI (presented by the computing device implementing the method 450, or by another computing device) is caused to display values of at least one of the second parameters and/or at least one parameter that is derived from one or more of the second parameters. The GUI may include a visual representation of the mapping between the user's step frequency and step length, and/or the user's instantaneous speed, for example. Other examples include average speed (as calculated using the current, instantaneous speed), current and/or average step length, and so on. In one implementation where the computing device implementing the method 450 is a mobile computing device (e.g., a smartphone or smart watch), for example, block 456 may include causing a GUI on a display of the mobile computing device to display the appropriate values. In some implementations where the computing device is instead a server remote from the user, and the user has expressly agreed to share his or her data, block 456 may include transmitting, via a wireless network (e.g., network 106 of FIG. 2 or network 206 of FIG. 3), data indicative of values of the second parameters (and/or data indicative of values of one or more parameters derived from the second parameters) to a mobile computing device of the user (e.g., a smartphone or smart watch) to cause a GUI of the mobile computing device to display the appropriate values.

The ordering of blocks shown in FIG. 7 does not necessarily mean that the blocks are performed strictly in that order. For example, in a real-time implementation, parameters may continue to be monitored at block 452 while earlier values of those parameters are processed at block 454 and/or while values are displayed at block 456. Moreover, the method 450 may include one or more additional blocks not shown in FIG. 7. For example, the method 450 may include an additional block, prior to block 454, at which a gait model (corresponding to a current gait type of the user) is selected from among a plurality of gait models (e.g., a running gait model and a walking gait model, as discussed above in connection with FIG. 4). In one such implementation, the mapping between step frequency and step length (discussed above in connection with block 454) is specific to the selected gait model. Moreover, values of that mapping, as output by the estimator, may be used to update the selected gait model (e.g., in real-time).

In some implementations, block 456 is omitted from the method 450. For example, the method 450 may instead include an additional block (not shown in FIG. 7) at which the second parameters are processed only for purposes other than display (e.g., to generate automated text-based suggestions to a particular user, or to automatically determine a race seeding for a particular user, etc.).

Example Aspects of the Invention

Although the foregoing text sets forth a detailed description of numerous different aspects and embodiments of the invention, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. By way of example, and not limitation, the disclosure herein contemplates at least the following aspects.

Aspect 1—A method, implemented in a computing device, for accurately estimating gait characteristics of a user, the method comprising: (1) monitoring a first plurality of parameters indicative of movement of the user, wherein monitoring the first plurality of parameters includes monitoring (i) a first GNSS-derived speed of the user and (ii) a step count of the user; (2) processing values of the monitored first plurality of parameters to determine values of a second plurality of parameters indicative of movement of the user, wherein processing values of the monitored first plurality of parameters includes applying, as inputs to an estimator having the second plurality of parameters as estimator states, one or both of (i) values of at least one of the monitored first plurality of parameters, and (ii) values of at least one parameter derived from one or more of the monitored first plurality of parameters, and wherein at least two parameters of the second plurality of parameters are collectively indicative of a mapping between step frequency of the user and step length of the user; and (3) causing a graphical user interface of the computing device or another computing device to display values of one or both of (i) at least one of the second plurality of parameters, and (ii) at least one parameter derived from one or more of the second plurality of parameters.

Aspect 2—The method of aspect 1, further comprising, prior to processing the values of the monitored first plurality of parameters: selecting, from among a plurality of gait models, a first gait model corresponding to a current gait type of the user, wherein the mapping between step frequency of the user and step length of the user is specific to the first gait model.

Aspect 3—The method of aspects 2, wherein the plurality of gait models includes a running gait model and a walking gait model.

Aspect 4—The method of aspect 2 or 3, further comprising: using values of the mapping between step frequency of the user and step length of the user, as output by the estimator, to update the first gait model.

Aspect 5—The method of any one of aspects 1-4, wherein the at least two parameters of the second plurality of parameters include (i) a slope of a line representing the mapping between step frequency of the user and step length of the user, and (ii) an intercept of the line representing the mapping between step frequency of the user and step length of the user.

Aspect 6—The method of any one of aspects 1-5, wherein an additional parameter of the second plurality of parameters is a speed of the user.

Aspect 7—The method of any one of aspects 1-6, wherein: monitoring the first plurality of parameters includes monitoring (i) the first GNSS-derived speed of the user, (ii) a second GNSS-derived speed of the user, and (iii) the step count of the user; the first GNSS-derived speed of the user is a speed determined using GNSS location; and the second GNSS-derived speed of the user is a speed determined using GNSS Doppler shift.

Aspect 8—The method of any one of aspects 1-7, wherein processing values of the monitored first plurality of parameters includes: predicting, at each of a plurality of time intervals, that values of the estimator states are unchanged from respective values of the estimator states at a most recent time interval.

Aspect 9—The method of any one of aspects 1-8, wherein the estimator is a Kalman filter.

Aspect 10—The method of aspect 9, wherein processing values of the monitored first plurality of parameters further includes dynamically setting values of a process noise covariance used by the Kalman filter.

Aspect 11—The method of aspect 10, wherein dynamically setting values of the process noise covariance includes increasing the process noise covariance when at least the step count of the user indicates the user has stopped.

Aspect 12—The method of aspect 10 or 11, wherein dynamically setting values of the process noise covariance includes increasing the process noise covariance when at least the first GNSS-derived speed of the user indicates the user has accelerated or decelerated by more than a threshold amount.

Aspect 13—The method of any one of aspects 1-12, wherein: the computing device is a mobile computing device of the user; and monitoring the first plurality of parameters indicative of movement of the user includes receiving real-time data generated by one or more devices external to the mobile computing device.

Aspect 14—The method of any one of aspects 1-12, wherein: the computing device is a server; monitoring a first plurality of parameters indicative of movement of the user includes receiving, from a mobile computing device of the user via a wireless network, real-time data generated by the mobile computing device; and causing a graphical user interface to display values includes transmitting, via the wireless network, one or both of (i) data indicative of values of the second plurality of parameters, and (ii) data indicative of values of one or more parameters derived from the second plurality of parameters, to the mobile computing device to cause a graphical user interface of the mobile computing device to display values of one or both of (i) the at least one of the second plurality of parameters, and (ii) the at least one parameter derived from the one or more of the second plurality of parameters.

Aspect 15—The method of any one of aspects 1-14, comprising: causing the graphical user interface of the computing device or the other computing device to display a visual representation of the mapping between step frequency of the user and step length of the user.

Aspect 16—A non-transitory, computer-readable medium storing instructions that, when executed by one or more processors of a computing device, cause the computing device to: (1) monitor a first plurality of parameters indicative of movement of a user, wherein the first plurality of parameters includes (i) a first GNSS-derived speed of the user and (ii) a step count of the user; (2) process values of the monitored first plurality of parameters to determine values of a second plurality of parameters indicative of movement of the user, wherein processing values of the monitored first plurality of parameters includes applying, as inputs to an estimator having the second plurality of parameters as estimator states, one or both of (i) values of at least one of the monitored first plurality of parameters, and (ii) values of at least one parameter derived from one or more of the monitored first plurality of parameters, and wherein at least two parameters of the second plurality of parameters are collectively indicative of a mapping between step frequency of the user and step length of the user; and (3) display on a graphical user interface of the computing device, or cause a graphical user interface of another computing device to display, values of one or both of (i) at least one of the second plurality of parameters, and (ii) at least one parameter derived from one or more of the second plurality of parameters.

Aspect 17—The non-transitory, computer-readable medium of aspect 16, wherein the instructions further cause the computing device to: (1) prior to processing the values of the monitored first plurality of parameters, select, from among a plurality of gait models, a first gait model corresponding to a current gait type of the user, wherein the mapping between step frequency of the user and step length of the user is specific to the first gait model, and wherein the plurality of gait models includes a running gait model and a walking gait model; and (2) use values of the mapping between step frequency of the user and step length of the user, as output by the estimator, to update the first gait model.

Aspect 18—A mobile computing device comprising: a display screen; one or more processors; and a memory storing instructions that, when executed by the one or more processors, cause the mobile computing device to (1) monitor a first plurality of parameters indicative of movement of a user of the mobile computing device, wherein the first plurality of parameters includes (i) a first GNSS-derived speed of the user and (ii) a step count of the user, (2) process values of the monitored first plurality of parameters to determine values of a second plurality of parameters indicative of movement of the user, wherein processing values of the monitored first plurality of parameters includes applying, as inputs to an estimator having the second plurality of parameters as estimator states, one or both of (i) values of at least one of the monitored first plurality of parameters, and (ii) values of at least one parameter derived from one or more of the monitored first plurality of parameters, and wherein at least two parameters of the second plurality of parameters are collectively indicative of a mapping between step frequency of the user and step length of the user, and (3) display, on a graphical user interface presented on the display screen, values of one or both of (i) at least one of the second plurality of parameters, and (ii) at least one parameter derived from one or more of the second plurality of parameters.

Aspect 19—The mobile computing device of aspect 18, further comprising a GNSS unit, wherein: the first plurality of parameters includes (i) the first GNSS-derived speed of the user, (ii) a second GNSS-derived speed of the user, and (iii) the step count of the user; the first GNSS-derived speed of the user is a speed determined using GNSS location; the second GNSS-derived speed of the user is a speed determined using GNSS Doppler shift; and the instructions cause the mobile computing device to (i) monitor the first GNSS-derived speed of the user at least by monitoring values of the first GNSS-derived speed generated by the GNSS unit; and (ii) monitor the second GNSS-derived speed of the user at least by monitoring values of the second GNSS-derived speed generated by the GNSS unit.

Aspect 20—The mobile computing device of aspect 18 or 19, further comprising a step counter unit, wherein: the instructions cause the mobile computing device to monitor the step count of the user at least by monitoring values of the step count generated by the step counter unit.

Aspect 21—The mobile computing device of any one of aspects 18-20, wherein the instructions cause the mobile computing device to display, on the graphical user interface presented on the display screen, a visual representation of the mapping between step frequency of the user and step length of the user.

Other Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or embodiment. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for estimating speed and/or gait characteristics in real time using a custom estimator through the disclosed principles in the present disclosure. Thus, while particular embodiments and applications have been illustrated and described, it is to be understood that the disclosed embodiments are not limited to the precise construction and components disclosed in the present disclosure. Various modifications, changes and variations, which will be apparent to those skilled in the art, may be made in the arrangement, operation and details of the method and apparatus disclosed in the present disclosure without departing from the spirit and scope defined in the appended claims.

What is claimed is:

1. A method, implemented in a computing device, for accurately estimating gait characteristics of a user, the method comprising:
   monitoring a first plurality of parameters indicative of movement of the user, wherein monitoring the first plurality of parameters includes monitoring (i) a first GNSS-derived speed of the user and (ii) a step count of the user;
   processing values of the monitored first plurality of parameters to determine values of a second plurality of parameters indicative of movement of the user,
      wherein processing values of the monitored first plurality of parameters includes using values of at least one of the monitored first plurality of parameters
      to generate one or more inputs to an estimator having the second plurality of parameters as estimator states, and
      wherein at least two parameters of the second plurality of parameters are collectively indicative of a mapping between step frequency of the user and step length of the user; and
   causing a graphical user interface of the computing device or another computing device to display values of one or both of (i) at least one of the second plurality of parameters, and (ii) at least one parameter derived from one or more of the second plurality of parameters.

2. The method of claim 1, further comprising, prior to processing the values of the monitored first plurality of parameters:
   selecting, from among a plurality of gait models, a first gait model corresponding to a current gait type of the user,
   wherein the mapping between step frequency of the user and step length of the user is specific to the first gait model.

3. The method of claim 2, wherein the plurality of gait models includes a running gait model and a walking gait model.

4. The method of claim 2, further comprising:
   using values of the mapping between step frequency of the user and step length of the user, as output by the estimator, to update the first gait model.

5. The method of claim 1, wherein the at least two parameters of the second plurality of parameters include (i) a slope of a line representing the mapping between step frequency of the user and step length of the user, and (ii) an intercept of the line representing the mapping between step frequency of the user and step length of the user.

6. The method of claim 1, wherein an additional parameter of the second plurality of parameters is a speed of the user.

7. The method of claim 1, wherein:
   monitoring the first plurality of parameters includes monitoring (i) the first GNSS-derived speed of the user, (ii) a second GNSS-derived speed of the user, and (iii) the step count of the user;
   the first GNSS-derived speed of the user is a speed determined using GNSS location; and
   the second GNSS-derived speed of the user is a speed determined using GNSS Doppler shift.

8. The method of claim 1, wherein using the values of the at least one of the monitored first plurality of parameters to generate the one or more inputs to the estimator includes:
   deriving values of a third plurality of parameters from the at least one of the first plurality of parameters; and
   applying the values of the third plurality of parameters as inputs to the estimator.

9. The method of claim 1, wherein using the values of the at least one of the monitored first plurality of parameters to generate the one or more inputs to the estimator includes:
   applying the values of the at least one of the monitored first plurality of parameters as inputs to the estimator.

10. The method of claim 1, wherein the estimator is a Kalman filter.

11. The method of claim 10, wherein processing values of the monitored first plurality of parameters further includes dynamically setting values of a process noise covariance used by the Kalman filter.

12. The method of claim 11, wherein dynamically setting values of the process noise covariance includes increasing the process noise covariance when at least the step count of the user indicates the user has stopped.

13. The method of claim 11, wherein dynamically setting values of the process noise covariance includes increasing the process noise covariance when at least the first GNSS-derived speed of the user indicates the user has accelerated or decelerated by more than a threshold amount.

14. The method of claim 1, wherein:
   the computing device is a mobile computing device of the user; and
   monitoring the first plurality of parameters indicative of movement of the user includes receiving real-time data generated by one or more devices external to the mobile computing device.

15. The method of claim 1, wherein:
   the computing device is a server;
   monitoring a first plurality of parameters indicative of movement of the user includes receiving, from a mobile computing device of the user via a wireless network, real-time data generated by the mobile computing device; and
   causing a graphical user interface to display values includes transmitting, via the wireless network, one or both of (i) data indicative of values of the second plurality of parameters, and (ii) data indicative of values of one or more parameters derived from the second plurality of parameters, to the mobile computing device to cause a graphical user interface of the mobile computing device to display values of one or both of (i) the at least one of the second plurality of parameters, and (ii) the at least one parameter derived from the one or more of the second plurality of parameters.

16. The method of claim 1, comprising:
   causing the graphical user interface of the computing device or the other computing device to display a visual representation of the mapping between step frequency of the user and step length of the user.

17. A non-transitory, computer-readable medium storing instructions that, when executed by one or more processors of a computing device, cause the computing device to:
   monitor a first plurality of parameters indicative of movement of a user, wherein the first plurality of parameters includes (i) a first GNSS-derived speed of the user and (ii) a step count of the user;

process values of the monitored first plurality of parameters to determine values of a second plurality of parameters indicative of movement of the user,
wherein processing values of the monitored first plurality of parameters includes using values of at least one of the monitored first plurality of parameters to generate one or more inputs to an estimator having the second plurality of parameters as estimator states, and
wherein at least two parameters of the second plurality of parameters are collectively indicative of a mapping between step frequency of the user and step length of the user; and
display on a graphical user interface of the computing device, or cause a graphical user interface of another computing device to display, values of one or both of (i) at least one of the second plurality of parameters, and (ii) at least one parameter derived from one or more of the second plurality of parameters.

18. The non-transitory, computer-readable medium of claim 17, wherein the instructions further cause the computing device to:
prior to processing the values of the monitored first plurality of parameters, select, from among a plurality of gait models, a first gait model corresponding to a current gait type of the user, wherein the mapping between step frequency of the user and step length of the user is specific to the first gait model, and wherein the plurality of gait models includes a running gait model and a walking gait model; and
use values of the mapping between step frequency of the user and step length of the user, as output by the estimator, to update the first gait model.

19. A mobile computing device comprising:
a display screen;
one or more processors; and
a memory storing instructions that, when executed by the one or more processors, cause the mobile computing device to
monitor a first plurality of parameters indicative of movement of a user of the mobile computing device, wherein the first plurality of parameters includes (i) a first GNSS-derived speed of the user and (ii) a step count of the user,
process values of the monitored first plurality of parameters to determine values of a second plurality of parameters indicative of movement of the user,
wherein processing values of the monitored first plurality of parameters includes using values of at least one of the monitored first plurality of parameters to generate one or more inputs to an estimator having the second plurality of parameters as estimator states, and
at least two parameters of the second plurality of parameters are collectively indicative of a mapping between step frequency of the user and step length of the user, and
display, on a graphical user interface presented on the display screen, values of one or both of (i) at least one of the second plurality of parameters, and (ii) at least one parameter derived from one or more of the second plurality of parameters.

20. The mobile computing device of claim 19, further comprising a GNSS unit, wherein:
the first plurality of parameters includes (i) the first GNSS-derived speed of the user, (ii) a second GNSS-derived speed of the user, and (iii) the step count of the user;
the first GNSS-derived speed of the user is a speed determined using GNSS location;
the second GNSS-derived speed of the user is a speed determined using GNSS Doppler shift; and
the instructions cause the mobile computing device to (i) monitor the first GNSS-derived speed of the user at least by monitoring values of the first GNSS-derived speed generated by the GNSS unit; and (ii) monitor the second GNSS-derived speed of the user at least by monitoring values of the second GNSS-derived speed generated by the GNSS unit.

21. The mobile computing device of claim 19, further comprising a step counter unit, wherein:
the instructions cause the mobile computing device to monitor the step count of the user at least by monitoring values of the step count generated by the step counter unit.

* * * * *